(12) United States Patent
Smiljanić

(10) Patent No.: US 7,397,796 B1
(45) Date of Patent: Jul. 8, 2008

(54) LOAD BALANCING ALGORITHMS IN NON-BLOCKING MULTISTAGE PACKET SWITCHES

(76) Inventor: Aleksandra Smiljanić, 96 E. Ave., #3, Atlantic Highlands, NJ (US) 07716

( * ) Notice: Subject to any disclaimer, the term of this patent is extended or adjusted under 35 U.S.C. 154(b) by 786 days.

(21) Appl. No.: 10/798,077

(22) Filed: Mar. 11, 2004

Related U.S. Application Data

(60) Provisional application No. 60/496,978, filed on Aug. 21, 2003.

(51) Int. Cl.
*H04L 12/50* (2006.01)

(52) U.S. Cl. .................. 370/390; 370/335; 370/386; 370/432

(58) Field of Classification Search ............. 340/825.5, 340/825.51; 370/58, 60, 61, 94, 390, 392, 370/335, 386, 432; 395/325, 425, 200, 800
See application file for complete search history.

(56) References Cited

U.S. PATENT DOCUMENTS

| | | | |
|---|---|---|---|
| 3,979,733 A | 9/1976 | Fraser | |
| 4,057,711 A | 11/1977 | Asthana et al. | |
| 4,516,238 A | 5/1985 | Huang et al. | |
| 4,621,359 A * | 11/1986 | McMillen | ............ 370/235 |
| 4,785,446 A | 11/1988 | Dias et al. | |
| 5,274,782 A * | 12/1993 | Chalasani et al. | ........... 710/317 |
| 5,315,587 A | 5/1994 | Kullander | |
| 5,390,173 A | 2/1995 | Spinney et al. | |
| 5,517,495 A | 5/1996 | Lund et al. | |
| 5,539,747 A | 7/1996 | Ito et al. | |
| 5,617,409 A | 4/1997 | Ozveren et al. | |
| 5,666,360 A * | 9/1997 | Chen et al. | ............ 370/390 |
| 5,907,485 A | 5/1999 | Van Loo et al. | |
| 5,974,028 A | 10/1999 | Ramakrishnan | |
| 6,046,979 A | 4/2000 | Bauman | |
| 6,072,772 A | 6/2000 | Charney et al. | |
| 6,307,835 B1 | 10/2001 | Kasper | |
| 6,335,930 B1 | 1/2002 | Lee | |

(Continued)

OTHER PUBLICATIONS

Amit Singhal, et al., "Terabit switching: a survey of techniques and current products", *Computer Communications* 25: 547-556 (2002).

(Continued)

*Primary Examiner*—Ricky Q. Ngo
*Assistant Examiner*—Henry Lam
(74) *Attorney, Agent, or Firm*—Hoffmann & Baron, LLP

(57) ABSTRACT

The present invention provides a method for balancing unicast or multicast flows in a multistage non-blocking fabric, wherein the fabric comprises at least one internal switching element (SE) stage, an input SE stage and an output SE stage. The method comprises: (a) receiving cells into the fabric wherein each cell is associated with an input subset and associated with an output subset according to the source and destination address of the cell, (b) assigning each cell to a flow, wherein cells sourced from the same input subset, and bound for the same output subset, or multiple output subsets, are assigned to the same flow, and (c) transmitting flows through the internal SE stage wherein cells of a particular flow are distributed among the internal switching elements, wherein the cells of each particular flow transmitted at each internal SE differs by at most h, wherein h is positive, whereby the flow in the fabric is balanced.

24 Claims, 6 Drawing Sheets

U.S. PATENT DOCUMENTS

| | | |
|---|---|---|
| 6,341,313 B1 | 1/2002 | Kanoh |
| 6,359,885 B1 | 3/2002 | Kim et al. |
| 6,405,258 B1 | 6/2002 | Erimli et al. |
| 6,618,379 B1 | 9/2003 | Ramamurthy et al. |
| 6,628,613 B1 | 9/2003 | Joung et al. |
| 6,633,543 B1 | 10/2003 | Storr |
| 6,636,480 B1 | 10/2003 | Walla et al. |

OTHER PUBLICATIONS

Jonathan S. Turner, "Optimal Nonblocking Multicast Virtual Circuit Switch" 0743-166x/94 *IEEE*: 298-305 (1994).

* cited by examiner $T_C = 50ns$ $T_C = 100ns$

NUMBER OF PORTS
$T_C = 50ns$

NUMBER OF PORTS
$T_C = 100ns$ $T_c = 50ns$ $T_c = 100ns$ $T_C = 50ns$ $T_C = 100ns$

LOAD BALANCING ALGORITHMS IN NON-BLOCKING MULTISTAGE PACKET SWITCHES

This application claims benefit from U.S. provisional Application Ser. No. 60/496,978, filed on Aug. 21, 2003, which application is incorporated herein by reference in its entirety.

TECHNICAL FIELD

The invention relates generally to methods, and apparatuses, for balancing data flows through multistage networks.

BACKGROUND OF THE INVENTION

Clos circuit switch has been proposed by Clos in 1953 at Bell Labs (C. Clos, "A study of non-blocking switching networks," *Bell Systems Technology Journal* 32:406-424 (1953)). FIG. 1 shows the connections between switching elements (SE) in a symmetric Clos three-stage switch. This interconnection rule is: the xth SE in some switching stage is connected to the xth input of each SE in the next stage (C. Clos, 32:406-424 (1953); J. Hui, *Switching and Traffic Theory for Integrated Broadband Networks*, Kluwer Academic Press 1990; F. K. Hwang, *The mathematical theory of nonblocking switching networks*, World Scientific, 1998). Here, all connections have the same bandwidths. It has been shown that a circuit can be established through the Clos switching fabric without rearranging existing circuits as long as the number of SEs in the second stage is at least twice the number of inputs of an SE in the first stage, i.e. $l \geq 2$ n. It has also been shown that a circuit can be established through the Clos switching fabric as long as the number of SEs in the second stage is no less than the number of inputs of an SE in the first stage, i.e. $l \geq n$. In the latter case, the number of required SEs and their total capacity are smaller due to the fact that the existing circuits can be rearranged. While the complexity of the switching fabric hardware is reduced, the complexity of the algorithm for a circuit setup is increased. In both cases, non-blocking property of the Clos architecture has been proven assuming the specific algorithms for circuit setup (F. K. Hwang, World Scientific, 1998). Various implications of Clos findings have been examined in W. Kabacinski et al. "50th anniversary of Clos networks," *IEEE Communication Magazine*, 41(10): 26-64 (October 2003).

The Clos switching fabric can be used for increasing capacity of packet switches as well. The interconnection of SEs would be the same as in the circuit switch case. However, these SEs should be reconfigured in each cell time slot based on the outputs of outstanding cells. Here, packets are split into cells of a fixed duration which is typically 50 ns (64 bytes at 10 Gb/s). Algorithms for circuit setup in Clos circuit switches cannot be readily applied in Clos packet switches. First, all SEs should be synchronized on a cell-by-cell basis. Then, an implementation of the algorithm that rearranges connections on a cell-by-cell basis in SEs of a rearrangeable non-blocking Clos switch would be prohibitively complex (J. Hui, Kluwer Academic Press 1990). So, the Clos fabric with the larger hardware, l=2n, is needed for a non-blocking packet switch. A scheduling algorithm that would provide non-blocking in a Clos packet switch would require higher processing complexity than its counterpart designed for a cross-bar switch (A. Smiljanić, "Flexible bandwidth allocation in terabit packet switches," *Proceedings of IEEE Conference on High Performance Switching and Routing*, June 2000, pp. 233-241; A. Smiljanić, "Flexible Bandwidth Allocation in High-Capacity Packet Switches," *IEEE/ACM Transactions on Networking*, April 2002, pp. 287-293). Few heuristics have been proposed to configure SEs in Clos packet switches without assessment of their blocking nature (McDermott et al., "Large-scale IP router using a high-speed optical switch element," *OSA Journal on Optical Networking*, www.osajon.org, July 2003, pp. 228-241; Oki et al., "Concurrent round-robin-based dispatching schemes for Clos-network switches," *IEEE/ACM Transactions on Networking*, 10(6): 830-844 (December 2002)).

On the other side, it has been recognized that a Clos packet switch in which the traffic load is balanced across the SEs provides non-blocking, i.e. with sufficiently large buffers it passes all the traffic if the outputs are not over-loaded. Such an architecture has been described in Chaney et al., "Design of a gigabit ATM switch," *Proceedings of INFOCOM* 1997, 1:2-11 (1997) and J. S. Turner, "An optimal nonblocking multicast virtual circuit switch," *Proceeding of INFOCOM* 1994, 1:298-305 (1994). Turner showed that the architecture is non-blocking if the traffic of each multicast session is balanced over the SEs in a Benes packet switch. Here the multicast session carries the information between end users in the network.

However, the delay that packets experience through the Clos switch has not been assessed. Delay guarantees are important for various applications, for example, interactive voice and video, web browsing, streaming etc. In previous work, flows of data belonging to individual multicast sessions were balanced over switching elements (SEs) in the middle stage. The delay for such load balancing mechanism is too long. In order to guarantee acceptable delays for sensitive applications, the utilization of the mechanisms that balances loads of individual sessions decreases unacceptably with switch size (A. Smiljanić, "Performance load balancing algorithm in Clos packet switches," *Proceedings of IEEE Workshop on High Performance Switching and Routing*, 2004; A. Smiljanić, "Load balancing algorithm in Clos packet switches," *Proceedings of IEEE International Conference on Communications*, 2004). Accordingly, a challenge in the field is providing a minimum required delay guarantee without unacceptably decreasing fabric utilization.

SUMMARY OF THE INVENTION

Figure 1:
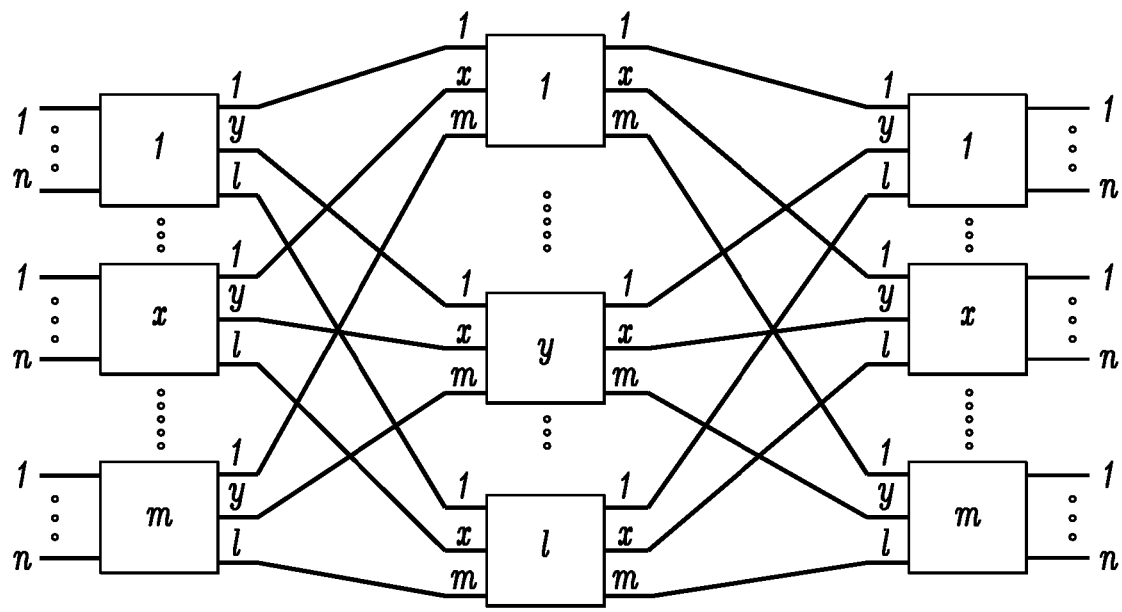
FIG. 1 is a diagram of a Clos switching fabric.

The present invention pertains to load balancing algorithms for non-blocking multistage packet switches. These algorithms allow for maximization of fabric utilization while providing a guaranteed delay.

In one embodiment, the present invention provides a method for balancing unicast or multicast data flow in a multistage non-blocking fabric. The fabric comprises at least one internal switching element (SE) stage, wherein the stage has l internal switching elements, and wherein each internal switching element is associated with a unique numerical identifier.

In the method, the input ports of the fabric are grouped into input sets whereby each input set consists of input ports that transmit through the same input SE. The input sets are further divided into input subsets, designated by i. The output ports of the fabric are also grouped into output sets whereby each output set consists of output ports that receive cells through the same output SE. The output sets are further divided into output subsets, designated by j.

Data cells are received into the fabric. If a cell is a unicast cell, then the cell is associated with an input subset i and associated with an output subset j based on the input port and the output port of the cell. On the other hand, if a cell is a multicast cell, then the cell is associated with an input subset and associated with multiple output subsets based on the input port and the output ports of the cell. Each cell is then assigned a flow. If the cells are unicast cells, then the cells which are associated with the same input subset i and associated with the same output subset j are assigned to the same flow. On the other hand, if the cells are multicast cells, then the cells which are associated with the same input subset and associated with the output subsets of the same output sets are assigned to the same flow.

The flows are then transmitted through the internal SE stage wherein cells of a particular flow are distributed among the internal switching elements. The quantity of the cells of each particular flow transmitted at each internal SE differs by at most h, wherein h is positive, preferably equal to one.

In this method, the number of subsets of at least one input set or at least one output set is less than n, wherein n is the number of ports of that input SE or of that output SE. N is the total number of input ports and output ports. $N_f$ is the maximum number of flows whose cells pass any given link. The variables of n, N, $N_f$, h, i, j and l are natural numbers. One or more flows are received by the fabric simultaneously.

Preferably, the flows are distributed among the internal SE stage by using a counter. For example, a unique counter is associated with each flow, designated as $c_{ij}$. The counter for each flow is initialized with a number less than or equal to l. A cell from a particular flow is transmitted through the internal switching element associated with a numerical identifier which is equal to the numerical value of the counter. After the cell has been transmitted through that internal switching element, the numerical value of the counter is changed by decrementing or incrementing the counter modulus l. Thus, if another cell of the particular flow is received, then the cell will be transmitted through the internal switching element associated with the updated numerical value of the counter, i.e. through a different internal SE. Then, after transmission, the counter is again changed by decrementing or incrementing the counter modulus l. Such process continues until there are no longer any cells received for the particular flow. The process is performed for cells of each flow.

The counters can be varied in any way which would allow for a sufficient variation of the internal switching elements used to transmit cells of the same flow. Preferably, the counter is varied by the following formula: $(c_{ij}+1) \mod l$, wherein l is the number of SEs in the internal SE stage.

In another embodiment, the present invention provides a flow control device which embodies the methods of the invention.

In a further embodiment, the present invention provides a multistage non-blocking fabric which embodies the methods of the invention.

For a better understanding of the present invention, reference is made to the following description, taken in conjunction with the accompanying drawings, and the scope of the invention set forth in the claims.

DETAILED DESCRIPTION OF THE INVENTION

The present invention pertains to load balancing algorithms for balancing data flow in a multistage non-blocking fabric (e.g. packet switching networks). A non-blocking fabric is defined as a fabric in which all the traffic for a given output gets through to its destination as long as the output port is not overloaded. These algorithms allow for maximization of fabric utilization while providing for a guaranteed delay. In these algorithms, either inputs or input SEs may balance traffic, and flows to either output SE or outputs may be balanced separately.

A fabric comprises packet switches. A packet switch is a system that is connected to multiple transmission links and does the central processing for the activity of a packet switching network where the network consists of switches, transmission links and terminals. The transmission links are connected to network equipment, such as multiplexers (MUX) and demultiplexers (DMUX). A terminal can be connected to the MUX/DMUX or it can be connected to the packet switch system. Generally, the packet switch consists of input and output transmission link controllers and the switching fabric. The input and output link controllers perform the protocol termination traffic management and system administration related to transmission jobs and packet transmission. These controllers also process the packets to help assist in the control of the internal switching of the switching fabric. The switching fabric of the packet switch performs space-division switching which switches each packet from its source link to its destination link.

A multistage fabric for the purposes of this specification comprises several switching element (SE) stages with a web of interconnections between adjacent stages. There is at least one internal switching element (SE) stage, wherein the stage has l internal switching elements, and wherein each internal switching element is associated with a unique numerical identifier. An internal SE stage is a stage that is between the input SE stage and the output SE stage.

Each SE stage consists of several basic switching elements where the switching elements perform the switching operation on individual cells. So, each cell is to be processed by the distributed switching elements without a central control scheme, and thus high throughput switching can be done.

The methods of the present invention can be applied to packets of variable length or packets of fixed length. If the packets received from the input links are of variable length, they are fragmented into fixed-size cells. Variable-length packets are preferably transmitted according to Ethernet protocol. If the packets arriving to the switch all have a fixed length, no fragmentation is required. Such packets are transmitted in accordance with asynchronous transfer mode (ATM) protocol. For the purposes of this invention, a packet of fixed length or a packet of variable length is referred to as a cell.

In the algorithms, the input ports of the fabric are grouped into input sets whereby each input set consists of input ports that transmit through the same input SE. The input sets are divided into input subsets. The output ports of the fabric are also grouped into output sets whereby each output set consists of output ports that receive cells through the same output SE. The output sets are divided into output subsets. Sets can be divided so that each input port and/or each output port belong to only one subset. Alternatively, sets can be divided so that each input port and/or each output port belong to more than one subset. The grouping into sets and division into subsets is made in any efficient manner as would be known by a skilled artisan.

For example, a fabric which comprises 100 input ports and 100 output ports can have the ports grouped into sets of five, i.e. input ports 1-5 belong to set one, and output ports 1-5 belong to set one; input ports 6-10 belong to set two, and output ports 6-10 belong to set two; etc. Then the input sets and output sets can be divided into subsets of, for example, even and odd numbered ports. So, in this example, input subsets would be (1,3,5), (2,4), (6,8,10), (7,9) etc.

In one preferred embodiment, each input port belongs to one subset. In another preferred embodiment, one or more of the input ports belong to at least two input subsets. Analogously, in one embodiment, each output port belongs to one subset. In another embodiment, one or more of the output ports belong to at least two input subsets.

Preferably, the number of subsets, and so the number of flows is as small as possible. For example if SEs are crossbars, the input subsets can be equal to the input ports themselves; and output subsets can be equal to the output sets themselves. Or if SEs are shared buffers, input subsets can be equal to either input ports or input sets, while output subsets can be equal to the output sets.

In some algorithms, input subsets can be equal to either input ports or input sets, while output subsets can be equal to either output ports or output sets. In a first load balancing algorithm of the invention, cells from some input port bound for the particular output SE are spread equally among internal SEs. In a second case, cells from some input port bound for the particular output port are spread equally among internal SEs. Then, the load is balanced by input SEs, e.g., an arbiter associated with each input SE determines to which internal SE a cell will be transmitted. In a third algorithm, cells transmitted from an input SE to some output SE are spread equally across the internal SEs. In a fourth algorithm, cells transmitted from an input SE to some output port are spread equally across the internal SEs.

The methods of the invention are used for both unicast and multicast cells. Cells are received into the fabric. Characteristics of cells being transmitted according to the Internet Protocol (IP) are identified from the packet headers. The packet header contains the source IP address, and the destination IP address. From these addresses, the i, j designation of the cell is obtained, where i is the designation of input subset and j is the designation of the output subset. Based on the i, j designations, each cell is assigned a flow by the following algorithms of the invention. A flow can contain an indefinite number of cells.

If a cell is a unicast cell, then the cell is associated with an input subset i and associated with an output subset j based on the input port and the output port of the cell. Then the cells which are associated with the same input subset and associated with the same output subset are assigned to the same flow.

Alternatively, if a cell is a multicast cell, then the cell is associated with an input subset i and associated with multiple output subsets {j} based on the input port and the multiple output ports of the cell, wherein {j} designates a set of output subsets. Then the cells which are associated with the same input subset and associated with the output subsets of the same output sets are assigned to the same flow.

As a way of illustration, using the example above, unicast cells that have the following input ports (x), and output port (y) are assigned to the same flow: (2, 1), (2, 3), (2, 5), (4, 1), (4, 3), (4, 5). As another example, cells that have the following i, j designations are assigned to the same flow: (2, 2), (2, 4), (4, 2), (4, 4).

The number of subsets of at least one input set or at least one output set is less than n, wherein n is the number of ports of that input SE or of that output SE. N is the total number of input ports and output ports. $N_f$ is the maximum number of flows whose cells pass any given link. The variables of n, N, $N_f$, h, i, j and l are natural numbers. These variables are defined by the particular fabric with which the invention is used as would be known by a skilled artisan. One or more flows are received by the fabric simultaneously.

The flows are transmitted through the internal SE stage wherein cells of a particular flow are distributed among the internal switching elements. The quantity of the cells of each particular flow transmitted at each internal SE differs by at most h, wherein h is positive. Preferably, h is less than 50, less than 25, less than 20, less than 15, less than 10, or less than 5. Most preferably h is equal to one.

An alternate manner by which to generally define flow follows. Two cells of the same unicast flow must be sourced by the same input set or be bound to the same output sets. Two cells of the same multicast flow must be sourced by the same input sets or be bound to the same sets of output sets.

Preferably, the flows are distributed among the internal SE stage by using a counter. For example, a unique counter is associated with each flow, designated as $c_{ij}$, wherein i is the numerical identifier of an associated input subset and j is the numerical identifier of an associated output subset;

The counter for each flow is initialized with a number less than or equal to l. A cell from a particular flow is transmitted through the internal switching element associated with a numerical identifier which is equal to the numerical value of the counter. After the cell has been transmitted through that internal switching element, the numerical value of the counter is changed by decrementing or incrementing the counter modulus l. Thus, if another cell of the particular flow is received, then the cell will be transmitted through the internal switching element associated with the updated numerical value of the counter, i.e. through a different internal SE. Then, after transmission, the counter is again changed by decrementing or incrementing the counter modulus l. Such process continues until there are no longer any cells received for the particular flow. The process is performed for cells of each flow. The variable $c_{ij}$ is a natural number.

A counter can be varied in any way which would allow for a sufficient distribution of cells of the same flow among the internal switching elements. The counter is varied by the following formula: $(c_{ij}+p) \bmod l$, wherein $\gcd(p,l)=1$, wherein gcd means greatest common divisor. Preferably, the counter is varied by the following formula: $(c_{ij}+1) \bmod l$, wherein l is the number of SEs in the internal SE stage. Alternatively, the counters can be varied in a random fashion In the first load balancing algorithm, input port i, $0 \leq i < N$, has m different counters associated with different output SEs, $c_{ij}$, $0 \leq j < m$. Here $N = nm$ is the number of switch input and output ports. A cell arriving to input port i and bound for the jth output SE is marked to be transmitted through the $c_{ij}$th output of its SE, i.e. to be transmitted through the $c_{ij}$th center SE. Then, the counter in question is varied. For example, the counter is incremented modulo l, namely $c_{ij} \leftarrow (c_{ij}+1)$ mod l.

In the second load balancing algorithm, input i, $0 \leq i < N$, stores N counters associated with different switch outputs, $c_{ij}$, $0 \leq j < N$. A cell arriving to input port i and bound for the jth switch output port is marked to be transmitted through the $c_{ij}$th output of its SE, i.e. to be transmitted through the $c_{ij}$th center SE. Then, the counter in question is varied, e.g., incremented modulo l.

In the third load balancing algorithm, input SE i, $0 \leq i < m$, stores m different counters associated with different output SEs, $c_{ij}$, $0 \leq j < m$. A cell arriving to input SE i and bound for the jth output SE is marked to be transmitted through the $c_{ij}$th output of its SE, i.e. to be transmitted through the $c_{ij}$th center SE. Then, the counter in question is varied, e.g., incremented modulo l.

In the fourth load balancing algorithm, input SE i, $0 \leq i < m$, stores N counters associated with different switch outputs, $c_{ij}$, $0 \leq j < N$. A cell arriving to input SE i and bound for the jth switch output port is marked to be transmitted through the $c_{ij}$th output of its SE, i.e. to be transmitted through the $c_{ij}$th center SE. Then, the counter in question is incremented modulo l.

In certain preferred embodiments of the invention, the method further comprises grouping cell time slots into frames of length F. In some of such embodiments, the counter of each flow is set at the beginning of each frame. The counter is set to $c_{ij} = (i+j)$ mod l, where i may be either an input or an input SE, and j may be either an output or an output SE.

In the embodiments wherein cell time slots are grouped into frames of length F, preferably, each frame input port (i) can transmit up to $a_{ij}$ cells to output port (j). The following boundaries hold:

$$\sum_k a_{ik} \leq SF - N_f, \quad \sum_k a_{ki} \leq SF - N_f$$

where S is the switching fabric speedup. Preferably, in this embodiment, the fabric speedup is defined as:

$$S = 1 + \frac{N_f}{F},$$

wherein:

$$\sum_k a_{ik} \leq F, \quad \sum_k a_{ki} \leq F.$$

In case, the utilization of the fabric is maximized. In this embodiment, with fabric speedup defined in any manner, preferably, at each stage only cells that have arrived in the same frame are transmitted to the next stage, wherein $F = D/3T_c$, or $F = D/4T_c$ if cells are reordered at the outputs, wherein D is the maximum tolerable delay and $T_c$ is cell time slot duration. Namely, cells passing through different center SEs may lose correct ordering, i.e. a cell that is transmitted earlier through some center SE may arrive to the output later than a cell that is transmitted later through another center SE. For this reason, cell reordering may be required at the switch outputs. In certain preferred embodiments of the invention, the number of flows should fulfill inequality $$N_f \leq (S-U) \cdot D/T_c,$$

where S is switching fabric speedup, U is targeted utilization of the switching fabric, D is the maximum tolerable delay and $T_c$ is cell time slot duration.

In a further embodiment wherein cell time slots are grouped into frames of length F, and wherein each frame can transmit $a_{ij}$ cells from input port (i) to output port (i), preferably, the number of flows sourced by an input SE or bound for an output SE that are balanced starting from different internal SEs differ by at most one, wherein:

$$\sum_k a_{ik} \leq \begin{cases} SF - \frac{N_f}{2} & F \geq \frac{N_f}{S} \\ \frac{(SF)^2}{2N_f} & F < \frac{N_f}{S} \end{cases}, \quad \sum_k a_{ki} \leq \begin{cases} SF - \frac{N_f}{2} & F \geq \frac{N_f}{S} \\ \frac{(SF)^2}{2N_f} & F < \frac{N_f}{S} \end{cases}$$

where S is the switching fabric speedup. In this embodiment, speedup is preferably defined as follows:

$$S = \begin{cases} 1 + \frac{N_f}{2F} & F \geq \frac{N_f}{2} \\ \sqrt{\frac{2N_f}{F}} & F < \frac{N_f}{2} \end{cases},$$

and wherein:

$$\sum_k a_{ik} \leq F, \quad \sum_k a_{ki} \leq F,$$

whereby utilization of the fabric is maximized. Preferably, in this embodiment, wherein speedup is defined in any manner, at each stage only cells that have arrived in the same frame are transmitted to the next stage, wherein $F = D/3T_c$, or $F = D/4T_c$ if cells are reordered at the outputs, wherein D is the maximum tolerable delay and $T_c$ is cell time slot duration.

In one embodiment, in the methods of the present invention the number of flows sourced by an input SE or bound for an output SE that are balanced starting from different internal SEs differs by at most 1, wherein $N_f$ fulfills:

$$N_f \leq \begin{cases} 2(S-U) \cdot F & U \geq \frac{S}{2} \\ \frac{S^2 F}{2U} & U < \frac{S}{2} \end{cases}$$

where S is the switching fabric speedup, U is targeted utilization of the switching fabric, D is the maximum tolerable delay and $T_c$ is cell time slot duration. Preferably, flow synchronization is achieved by resetting counters each frame. In some proposed algorithms, counters are set in each frame to $c_{ij}=(i+j) \bmod l$, where i maybe either input or input SE, and j may be either output or output SE.

The methods of the present invention are analyzed in the present specification by means of theorems and proofs thereof, and by means of examples.

Theorem 1: Non-blocking is provided without link speedup if $l \geq n$.

Proof: Let $SE_{ij}$ denote the jth SE in stage i throughout this specification. In all algorithms, each input, or input SE, will transmit the traffic at equal rates through the connections from input (first stage) to center (second stage) SEs, and, consequently the rate transmitted through any of these connections is:

$$R' = \sum_{i' \in SE_{1i}} \frac{s_{i'}}{l} \leq \frac{n \cdot R}{l}, \qquad (1)$$

where $s_{i'}$, is the rate at which input i' sends the traffic. If r'k' denotes the rate at which input i' sends the traffic to output k', then the rate transmitted through a connection from a center (second stage) SE to an output (third stage) SE, say $SE_{3k}$, is:

$$R'' = \sum_{i'} \sum_{k' \in SE_{3k}} \frac{r_{i'k'}}{l} \leq \frac{nR}{l} \qquad (2)$$

wherein the outputs are not overloaded. So, the maximum rate supported by a connection in the fabric should fulfill:

$$S = \frac{R_c}{R} \geq \frac{n}{l}, \qquad (3)$$

because equality may be reached in (1,2). So, non-blocking is provided without link speedup, i.e. with S=1, if $l \geq n$.

Traffic of each individual flow is balanced independently across the SEs. If there are many flows that transmit cells across some SE at the same time, the cells will experience long delay. Many applications, e.g. voice and video, require rate and delay guarantees. The worst case utilizations for balancing algorithms that provide rate and delay guarantees has been assessed.

Time is divided into frames of F cells, and each input-output pair is guaranteed a specified number of time slots per frame, for example $a_{ij}$ time slots are guaranteed to input-output pair (i, j), $0 \leq i$, $j < N$. Each input, and each output can be assigned at most $F_u$ time slots per frame, i.e.

$$\sum_k a_{ik} \leq F_u, \quad \sum_k a_{ki} \leq F_u. \qquad (4)$$

$F_u$ is evaluated in terms of F, N, $N_f$ for various load balancing algorithms, under the assumption that that l=n. Here $N_f$ is the maximum number of flows passing through some connection that are separately balanced.

It is assumed that there is a coarse synchronization in a switch, i.e. that at some point of time the input ports schedule cells belonging to the same frame. A possible implementation for such a coarse synchronization is described later. The coarse synchronization may introduce an additional delay smaller than the frame duration, but may also simplify the controller implementation. Otherwise, SEs should give priority to the earlier frames which complicates their schedulers; also cell resequencing becomes more complex because the maximum jitter is increased. The delay that a cell may experience through Clos switch is three times the frame duration D=3FTc, or D=4FT$_c$ if cells are reordered at the outputs.

The number of cells per frame sent from a given input SE through a given center SE ($F'_c \leq F$) in terms of $F_u$, and the maximal utilization of the connections from input ports to center SEs ($F_u/F$) is calculated. Because of the symmetry, utilization is the same for the connections from center to output SEs, as shown below. Note that all lemmas and theorems hold in large switches where n>10.

Lemma 1: Let $F'_c$, denote the maximum number of cells per frame sent from a given input SE through a given center SE. It holds that:

$$F_c \geq F_u + N'_f - n, \qquad (5)$$

where $N'_f$ denotes the number of flows sourced by $SE_{1i}$ that pass through the links from this SE to center SEs.

Proof: Let $f_{ig}$, $0 \leq g \leq N'_f$, denote the number of time slots per frame that are guaranteed to the individual flows sourced by $SE_{1i}$. It follows:

$$F'_c \leq \sum_g \left\lceil \frac{f'_{ig}}{n} \right\rceil \Rightarrow F'_c < \sum_g \frac{f'_{ig}}{n} + N'_f \Rightarrow F'_c < F_u + N'_f, \qquad (6)$$

where $\lceil x \rceil$ is the smallest integer no less than x, i.e. $\lceil x \rceil < x+1$. The maximum number of cells sourced by $SE_{1i}$ that may happen to be transmitted through the given center SE, say $SE_{2j}$, has been found. It was assumed that out of $N'_f$ flows sourced by $SE_{1i}$, $N'_f - n$ flows are assigned one time slot per frame, and the remaining n flows are assigned $\max(0, nF_u - (N'_f - n))$ time slots per frame. If it happens that first cells in a frame of all flows are sent through $SE_{2j}$, the total number of cells per frame transmitted through $SE_{2j}$ from $SE_{1i}$ will be:

$$F'_c = \max\left(N'_f, N'_f - n + n\left\lceil \frac{F_u}{n} - \frac{N'_f}{N} \right\rceil\right) \qquad (7)$$

$$= \max\left(N'_f, F_u + \frac{(n-1)N'_f - (nF_u - N'_f) \bmod N}{n}\right).$$

Note that in this case $F_c'$ almost reaches the upper bound in (6) for n>10, because n<<N$\leq F_u$, and claim of the lemma follows.

Lemma 2: Maximum utilization of the links from input ports to center SEs is:

$$U'_a = \begin{cases} S - \dfrac{N'_f}{F} & F \geq \dfrac{N'_f}{S} \\ 0 & F < \dfrac{N'_f}{S} \end{cases} \qquad (8)$$

Proof. Since $F_c' \leq SF$ for any of the internal connections in the fabric, from Lemma 1 it follows that:

$$F_u \leq SF - N'_f \qquad (9)$$

If (9) holds, all cells pass from $SE_{1i}$ to center SEs within designated frames. So, the maximum utilization of the links from input to center SEs is:

$$U'_a = \frac{F_u}{F} = \begin{cases} S - \frac{N'_f}{F} & F \geq \frac{N'_f}{S} \\ 0 & F < \frac{N'_f}{S} \end{cases}$$

where the last approximation holds for large switches for which n>10.

Lemma 3: Let $F_c''$ denote the maximum number of cells per frame sent to a given output SE through a given center SE. It holds that:

$$F_c'' \geq F_u + N''_f \quad (10)$$

where $N''_f$ denotes the number of flows bound to $SE_{3k}$ that pass through the links from center SEs to this output SE.

Proof. Let $f_{kg}''$, $0 \leq g \leq N''_f$, denote the number of time slots per frame that are guaranteed to the individual flows bound for $SE_{3k}$. Similarly, as in the proof of Lemma 1, it holds that:

$$F_c'' < F_u + N''_f \quad (11)$$

Similarly, as in the proof of Lemma 1, out of $N''_f$ flows bound for $SE_{3k}$, $N''_f-n$ flows may transmit one cell per frame that pass through $SE_{2j}$, and $n$ flows may transmit remaining max $(0, nF_u-N'_f+n)$ cells. If it happens that first cells in a frame of all flows are sent through $SE_{2j}$, the upper bound in (11) is almost reached, and claim of the lemma follows.

Lemma 4: Maximum utilization of the links from center to output SEs is:

$$U''_a = \begin{cases} S - \frac{N''_f}{F} & F \geq \frac{N''_f}{S} \\ 0 & F < \frac{N''_f}{S} \end{cases} \quad (12)$$

Proof: Maximum utilization of the links from center to output SEs can be derived from Lemma 3 as:

$$F_c'' = F_u + N''_f \leq SF \Rightarrow U''_a = \frac{F_u}{F} = \begin{cases} S - \frac{N''_f}{F} & F \geq \frac{N''_f}{S} \\ 0 & F < \frac{N''_f}{S} \end{cases} \quad (13)$$

Theorem 2: Maximum utilization of any internal link in the fabric under which all cells pass it within designated frames is:

$$U_a = \begin{cases} S - \frac{N_f}{F} & F \geq \frac{N_f}{S} \\ 0 & F < \frac{N_f}{S} \end{cases} \quad (14)$$

where $N_f$ is the maximum number of flows sourced by any input SE or bound for any output SE, i.e. the maximum number of flows that are passing through some internal link of the fabric.

Proof: Maximum utilization of any internal link in the fabric under which all cells pass it within designated frames can be derived from Lemmas 2 and 4:

$$U_a = \min_{N'_f, N''_f}(U'_a, U''_a) = \begin{cases} S - \frac{N_f}{F} & F \geq \frac{N_f}{S} \\ 0 & F < \frac{N_f}{S} \end{cases} \quad (15)$$

where $N_f$ is the maximum number of flows sourced by any input SE or bound to any output SE, i.e. the maximum number of flows that are passing through some internal link of the fabric.

Note that Theorem 2 holds for Benes network with an arbitrary number of stages as described in Chaney et al., *Proceedings of INFOCOM* 1997 1:2-11 and J. S. Turner *Proceedings of INFOCOM* 1994 1:298-305. In that case, the latter definition of $N_f$ holds, i.e. $N_f$ is the maximum number of flows that are passing through some internal link of the fabric.

The maximum utilization when different flows bound for the same SE are not properly synchronized was calculated, so they might send cells within a given frame starting from the same center SE. Alternatively, equal numbers of flows are balanced starting from different center SEs in each frame. For example, flow g of $SE_{1i}$ resets its counter at the beginning of a frame to $c_{ig}=(i+g)$ mod n. Or, flow g bound to $SE_{3k}$ resets its counter at the beginning of a frame to $c_{kg}=(k+g)$ mod n. It is assumed that $N_f>10n$ in order to simplify the analysis of load balancing algorithms with synchronized counters.

Lemma 5: In load balancing algorithms with synchronized counters, if:

$$F_u \geq \frac{N'_f}{2},$$

it holds that:

$$F'_c = F_u + \frac{N'_f}{2}, \quad (16)$$

otherwise if:

$$\frac{10N'_f}{8N} \leq F_u < \frac{N'_f}{2},$$

it holds that:

$$F'_c = \sqrt{2F_u N'_f} \quad (17)$$

Proof: The maximum number of cells that are transmitted from $SE_{1i}$ through $SE_{2(n-1)}$ in the middle stage is calculated, and the same result holds for any other center SE. Let $f_{jg}$ denote the number of cells in flow g which is balanced starting from $SE_{2j}$ at the beginning of each frame, where $j=(i+g)$ mod n. Then, the number of cells in flow g transmitted from $SE_{1i}$ through $SE_{2(n-1)}$ is $$\left\lfloor \frac{f'_{ig} + (i+g) \bmod n}{n} \right\rfloor,$$

where $\lfloor x \rfloor$ is the smallest integer not greater than x i.e. $\lfloor x \rfloor \leq x$. So, the number of cells from $SE_{1i}$ through $SE_{2(n-1)}$ is:

$$F'_c = \sum_{0 \leq g < N'_f} \left\lfloor \frac{f'_{ig} + (i+g) \bmod n}{n} \right\rfloor \leq \qquad (18)$$

$$\sum_{0 \leq g < N'_f} \frac{f'_{ig} + (i+g) \bmod n}{n} \approx F_u + \frac{N'_f}{n} \cdot \frac{n-1}{2}$$

$$\approx F_u + \frac{N'_f}{2},$$

for n>10 and $N_f$>10n. Note that inequality (18) holds for n>10 and $N_f$ mod n=0 as well. Equality in (18) is reached if f:

$$f'_{ig} = n - (i+g) \bmod n + n \cdot y_{ig}', \qquad (19)$$

where $y_{ig}' \geq 0$ are integers. Values $f'_{ig}$ that satisfy condition (19) exist if it holds that:

$$nF_u = \sum_{0 \leq g < N'_f} f'_{jg} \geq \sum_{0 \leq g < N''_f} (n - (i+g) \bmod n) = \qquad (20)$$

$$\frac{N'_f}{n} \cdot \frac{n(n+1)}{2} \Leftrightarrow F_u \geq \frac{N'_f}{n} \cdot \frac{n+1}{2} \approx \frac{N'_f}{2},$$

for n>10 and $N_f$>10n.

Note that inequality (20) holds for n>10 and $N_f$ mod n=0 as well. When inequality (20) holds, equality in (18) may be reached, and:

$$F'_c = F_u + \frac{N'_f}{2}, \qquad (21)$$

If inequality (20) does not hold:

$$\frac{N'_f}{n} \cdot \frac{z(z+1)}{2} \leq nF_u < \frac{N'_f}{n} \cdot \frac{(z+1) \cdot (z+2)}{2} \Leftrightarrow z = \qquad (22)$$

$$\left\lfloor \frac{-1 + \sqrt{1 + \frac{8NF_u}{N'_f}}}{2} \right\rfloor,$$

where $0 \leq z < n$ is an integer. For $$F_u > \frac{10N'_f}{8N}:$$

$$z \approx \sqrt{\frac{2NF_u}{N'_f}} \qquad (23)$$

$F_c'$ is maximal for:

$$f'_{ig} = \begin{cases} n-q & n-z \leq q = (i+g) \bmod n = n \\ 0 & 0 \leq (i+g) \bmod n < n-z. \end{cases} \qquad (24)$$

If $10N'_f/(8N) \leq F_u < N'_f/2$ from (18, 23, 24):

$$F'_c = \frac{N_f z}{n} \approx \sqrt{2F_u N'_f} \qquad (25)$$

Lemma 6: Maximum utilization of the links from input to center SEs, when the counters are synchronized is:

$$U'_r = \begin{cases} S - \frac{N'_f}{2F} & F \geq \frac{N'_f}{S} \\ \frac{S^2 F}{2N'_f} & F < \frac{N'_f}{S}. \end{cases} \qquad (26)$$

Proof: Since $F_c' \leq SF$, from Lemma 5 it follows that for $F_u \geq N_f/2$, $$F'_c = F_u + \frac{N'_f}{2} \leq SF \Rightarrow U'_r = \frac{F_u}{F} \leq S - \frac{N'_f}{2F} F \geq \frac{N'_f}{S}. \qquad (27)$$

and for $$\frac{10N'_f}{8N} \leq F_u < \frac{N'_f}{2}:$$

$$F'_c = \sqrt{2F_u N'_f} \leq SF \Rightarrow \qquad (28)$$

$$U'_r = \frac{F_u}{F} \leq \min\left(\frac{N'_f}{2F}, \frac{S^2 F}{2N'_f}\right).$$

So, the maximum utilization when counters are reset each frame is:

$$U'_r = \frac{F_u}{F} \leq \begin{cases} S - \frac{N'_f}{2F} & F_u \geq \frac{N'_f}{2} \\ \min\left(\frac{N'_f}{2F}, \frac{S^2 F}{2N'_f}\right) & \frac{10N'_f}{8N} \leq F_u < \frac{N'_f}{2} \\ \frac{10N'_f}{8NF} & F_u < \frac{10N'_f}{8N} \end{cases} \qquad (29)$$

From equations (27, 29), it follows that:

$$U'_r = \begin{cases} S - \dfrac{N'_f}{2F} & F \geq \dfrac{N'_f}{S} \\ \dfrac{S^2 F}{2N'_f} & F < \dfrac{N'_f}{S} \end{cases} \quad (30)$$

Here $$\frac{10 N'_f}{8NF}$$

$\ll 1$ because $N'_f \leq F$ and $N \gg 1$, so range $$F_u < \frac{10 N'_f}{8N}$$

is not of a practical interest and was omitted in the final formula.

Lemma 7. In load balancing algorithms with synchronized counters, if:

$$F_u \geq \frac{N''_f}{2},$$

it holds that:

$$F''_c = F_u + \frac{N''_f}{2},$$

otherwise if:

$$\frac{10 N''_f}{8N} \leq F_u < \frac{N''_f}{2},$$

it holds that:

$$F_c'' = \sqrt{2 F_u N''_f} \quad (32)$$

Proof. First the maximum number of cells that are transmitted to $SE_{3k}$ through $SE_{2(n-1)}$ in the middle stage is calculated, and the same result holds for any other center SE. Let $f_{kg}''$ denote the number of cells in flow g transmitted to $SE_{3k}$ that are balanced starting from $SE_{2j}$ at the beginning of each frame, where $j = (k+g) \bmod n$. Then, the number of cells in flow g transmitted to $SE_{3k}$ through $SE_{2(n-1)}$ is $\lfloor (F_{kg}'' + (k+g) \bmod n)/n \rfloor$. Similarly, as in the proof of Lemma 5, it holds that:

$$F_c'' \leq F_u + \frac{N''_f}{2} \quad (33)$$

If inequality $$F_u \geq \frac{N''_f}{2} \quad (34)$$

holds, equality in (33) may be reached, so:

$$F_c'' = F_u + \frac{N''_f}{2} \quad (35)$$

Similarly, as in the proof of Lemma 5, if it holds that:

$$\frac{10 N''_f}{8N} \leq F_u \frac{N''_f}{2} \quad (36)$$

then:

$$F_c'' = \sqrt{2 F_u N''_f} \quad (37)$$

Lemma 8: Maximum utilization of the links from center to output SEs when the counters are reset each frame is:

$$U_r'' = \begin{cases} S - \dfrac{N''_f}{2F} & F \geq \dfrac{N''_f}{S} \\ \dfrac{S^2 F}{2 N''_f} & F < \dfrac{N''_f}{S} \end{cases} \quad (38)$$

Proof: Since $F_c'' \leq SF$, from Lemma 7 it follows that for $F_u \geq N''_f / 2$:

$$F_c'' = F_u + \frac{N''_f}{2} \leq SF \Rightarrow U_r'' = \frac{F_u}{F} \leq S - \frac{N''_f}{2F} F \geq \frac{N''_f}{S}. \quad (39)$$

and for $10 N''_f / (8N) \leq F_c'' < N''_f / 2$:

$$F_c'' = \sqrt{2 F_u N''_f} \leq SF \Rightarrow U_r'' = \frac{F_u}{F} \leq \min\left(\frac{N''_f}{2F}, \frac{S^2 F}{2 N''_f}\right). \quad (40)$$

So, maximum utilization of the links from center to output SEs is:

$$U_r'' = \frac{F_u}{F} \leq \begin{cases} S - \dfrac{N''_f}{2F} & F_u \geq \dfrac{N''_f}{2} \\ \min\left(\dfrac{N''_f}{2F}, \dfrac{S^2 F}{2 N''_f}\right) & \dfrac{10 N''_f}{8N} \leq F_u < \dfrac{N''_f}{2} \\ \dfrac{10 N''_f}{8NF} & F_u \leq \dfrac{10 N''_f}{8N} \end{cases} \quad (41)$$

From equations (39, 41), it follows that:

$$U_r'' = \begin{cases} S - \dfrac{N_f''}{2F} & F \geq \dfrac{N_f''}{S} \\ \dfrac{S^2 F}{2N_f''} & F < \dfrac{N_f''}{S} \end{cases} \quad (42)$$

Theorem 3: In the algorithms where balancing of different flows is synchronized, maximum utilization of any internal link in the fabric under which all cells pass it within designated frames is:

$$U_r = \begin{cases} S - \dfrac{N_f}{2F} & F \geq \dfrac{N_f}{S} \\ \dfrac{S^2 F}{2N_f} & F < \dfrac{N_f}{S} \end{cases} \quad (43)$$

Proof: Maximum utilization of any internal link in the fabric under which all cells pass it within designated frames is derived from Lemmas 6 and 8 to be:

$$U_r = \min_{N_f', N_f''} (U_r', U_r'') = \begin{cases} S - \dfrac{N_f}{2F} & F \geq \dfrac{N_f}{S} \\ \dfrac{S^2 F}{2N_f} & F < \dfrac{N_f}{S} \end{cases} \quad (44)$$

Note that Theorem 3 provides the maximum utilization when both balancing of flows sourced by an input SE, and balancing of flows bound for an output SE are synchronized. This assumption holds in all the algorithms.

Often, signal transmission over the fibers connecting distant routers requires the most complex and costly hardware. Therefore, it is important to provide the highest utilization of the fiber transmission capacity. For this reason, switching fabrics with the speedup have been previously proposed. Namely, internal links of the fabric have higher capacity than the external links:

$$S = \dfrac{R_c}{R} \geq 1, \quad (45)$$

where R is a bit-rate at which data is transmitted through the fibers, and $R_c$ is a bit-rate at which data is transmitted through the fabric connections.

Theorem 4: The speedup S required to pass all incoming packets with a tolerable delay when counters are not synchronized is:

$$S_a \geq 1 + \dfrac{N_f}{F} \quad (46)$$

and the speedup when counters are synchronized is:

$$S_r \geq \begin{cases} 1 + \dfrac{N_f}{2F} & F \geq \dfrac{N_f}{2} \\ \sqrt{\dfrac{2N_f}{F}} & F < \dfrac{N_f}{2} \end{cases} \quad (47)$$

Proof: It should hold that $F_u = F$ while $F_c \leq SF$, where $F_c$ is the number of cells passing through some internal link per frame. When the counters are not synchronized from Lemmas 1 and 3 it follows that:

$$S_a F \geq \max(F_c', F_c'') = F + N_f$$

and so:

$$S_a \geq 1 + \dfrac{N_f}{F}. \quad (48)$$

When the counters are synchronized, from Lemmas 5 and 7 it follows that:

$$S_r F \geq \max(F_c', F_c'') = \begin{cases} F + \dfrac{N_f}{2} & F \geq \dfrac{N_f}{2} \\ \sqrt{2FN_f} & \dfrac{10N_f}{8N} \leq F < \dfrac{N_f}{2} \end{cases}.$$

and so $$S_r \geq \begin{cases} 1 + \dfrac{N_f}{2F} & F \geq \dfrac{N_f}{2} \\ \sqrt{\dfrac{2N_f}{F}} & F < \dfrac{N_f}{2} \end{cases} \quad (49)$$

because $F \geq N_f > 10 N_f/(8N)$, since $N \geq 2$. Note that the speedup smaller than 1 means that no speedup is really needed.

The performance of a load balancing algorithm depends on the number of flows that are separately balanced. Let $N_f$ denote the maximum number of balanced flows passing through some internal link. As noted before, $N_f$ is equal to the maximum number of flows sourced by some input SE or bound to some output SE. In the first algorithm $N_f = N$, because any input SE sources $n^2 = N$ flows, and each of N inputs balances one flow for any output SE. In the second algorithm, $N_f = nN$, because any input SE sources nN flows, and each of N inputs balances n flows bound for any output SE. In the third algorithm, $N_f = n$ because any input SE sources n flows, and each of n input SEs balances one flow for any output SE. In the fourth algorithm, $N_f = N$ because any input SE sources N flows, and each of n input SEs balances n flows for any output SE.

Under the assumption of no speedup, i.e. S=1, the maximum utilizations for described load balancing algorithms by substituting $N_f$ in formula (14) are obtained:

$$U_{a1} = U_{a4} = \begin{cases} 1 - \dfrac{N}{F} & F \geq N \\ 0 & F < N \end{cases}, \quad (50)$$

-continued $$U_{a2} = \begin{cases} 1 - \dfrac{nN}{F} & F \geq nN \\ 0 & F < nN \end{cases},$$

$$U_{a3} \approx 1.$$

Thus, the second load balancing algorithm is least efficient, while the third algorithm is most efficient.

In order to increase the efficiency of the load balancing algorithms, in one embodiment of the present invention, the frame length is increased. The cell delay is proportional to the frame length. So the maximum frame length is determined by the delay that could be tolerated by the applications, such as interactive voice and video. Assume that the maximum delay that can be tolerated by interactive applications is D, and the cell time slot duration is $T_c$, then $$F \leq \dfrac{D}{3T_c} \tag{51}$$

and:

$$U_{a1} = U_{a4} = \begin{cases} 1 - \dfrac{3NT_c}{D} & D \geq 3NT_c \\ 0 & D < 3NT_c \end{cases}, \tag{52}$$

$$U_{a2} = \begin{cases} 1 - \dfrac{3nNT_c}{D} & D \geq 3nNT_c \\ 0 & D < 3nNT_c \end{cases},$$

One way packet delay that can be tolerated by interactive applications is around 150 ms, but only 50-60 ms of this allowed delay can be budgeted for the queueing. The switch delay as low as 3 ms may be required for various reasons. For example, packets might pass multiple packet switches from their sources to the destinations, and packet delays through these switches would add. Also, in order to provide flexible multicasting, the ports should forward packets multiple times through the packet switch, and the packet delay is prolonged accordingly (Chaney et al., *Proceedings of INFOCOM* 1997, 1:2-11 (1997); A. Smiljanić, "Scheduling of Multicast Traffic in High-Capacity Packet Switches," *IEICE/IEEE Workshop on High-Performance Switching and Routing*, May 2002, pp. 29-33; A. Smiljanić, "Scheduling of Multicast Traffic in High-Capacity Packet Switches," *IEEE Communication Magazine*, November 2002, pp. 72-77; and J. S. Turner, *Proceeding of INFOCOM* 1994, 1:298-305 (1994)).

Figure 2A:
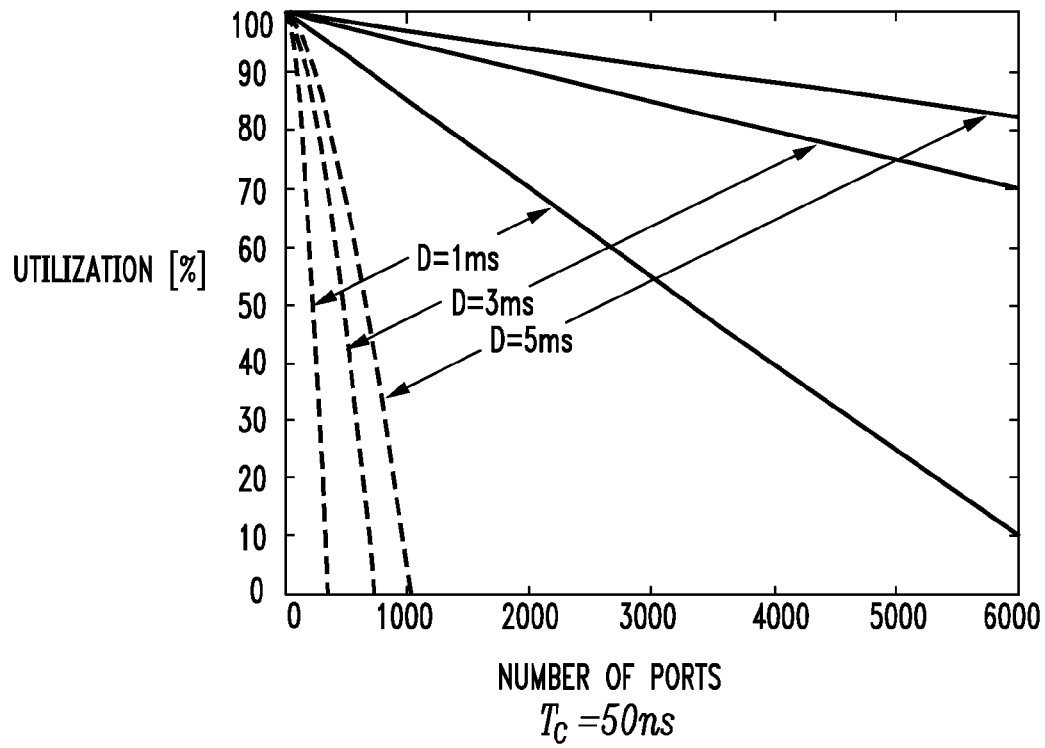
FIG. 2 is a graph of a switch utilization: solid curves represent the algorithm in which inputs balance flows bound for output SEs, and to the algorithm in which input SEs balance flows bound for outputs; dashed curves correspond to the algorithm in which inputs balance flows bound for outputs.
Figure 2B:
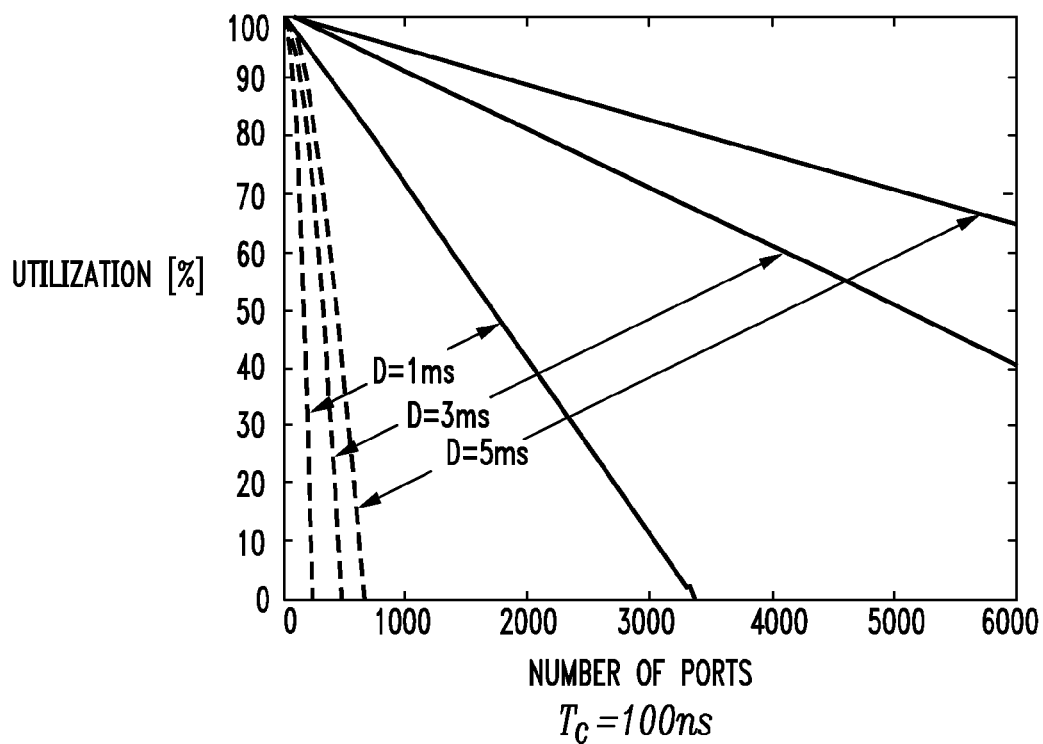

FIG. 2 shows the fabric utilization decreases as the switch size increases for various tolerable delays. In FIG. 2(*a*) $T_c$=50 ns, while in FIG. 2(*b*) $T_c$=100 ns. The solid curves represent the first and fourth algorithms ($N_f$=N), while the dashed curves correspond to the second algorithm ($N_f$=nN). The efficiency of the second balancing algorithm might decrease unacceptably as the switch size increases. For example, the utilization of a fabric with 1000 ports drops below 10% for a tolerable delay of 3 ms and $T_c$=50 ns. On the other side, for the same tolerable delay and cell duration, the utilization of a fabric with 4000 ports is 90% if the first or the fourth load balancing algorithm is applied. Note that utilizations are lower in FIG. 3 (*b*) when the cell duration is longer $T_c$=100 ns.

Thus, the first and fourth load balancing algorithms (for which $N_f$=N) provide a superior performance.

Flows balanced starting from different center SEs improve the efficiency of load balancing. Namely, at the beginning of each frame, counters are set to the appropriate values, e.g. $c_{ij}$=(i+j) mod n, where $0 \leq i < N$, $0 \leq j < n$ for the first load balancing algorithm, $0 \leq i, j < N$ for the second algorithm, $0 \leq i < n$, $0 \leq j < N$ for the fourth algorithm. (Efficiency of the third algorithm is already close to 100%.) Because in all these cases $N_f \geq N > 10$ n and n>10, the guaranteed utilizations for the enhanced load balancing algorithms is derived by substituting $N_f$ in formula (43) as follows:

$$U_{r1} = U_{r4} = \begin{cases} 1 - \dfrac{N}{2F} & F \geq N \\ \dfrac{F}{2N} & F < N \end{cases}, \tag{53}$$

$$U_{r2} = \begin{cases} 1 - \dfrac{nN}{2F} & F \geq nN \\ \dfrac{F}{2nN} & F < nN \end{cases}.$$

It follows that:

$$U_{r1} = U_{r4} = \begin{cases} 1 - \dfrac{3NT_c}{2D} & D \geq 3NT_c \\ \dfrac{D}{6NT_c} & D < 3NT_c \end{cases}, \tag{54}$$

$$U_{r2} = \begin{cases} 1 - \dfrac{3nNT_c}{2D} & D \geq 3nNT_c \\ \dfrac{D}{6nNT_c} & D < 3nNT_c \end{cases},$$

where D is the maximum delay that can be tolerated, and again it is assumed that there is no speedup, i.e. that S=1.

Figure 3A:
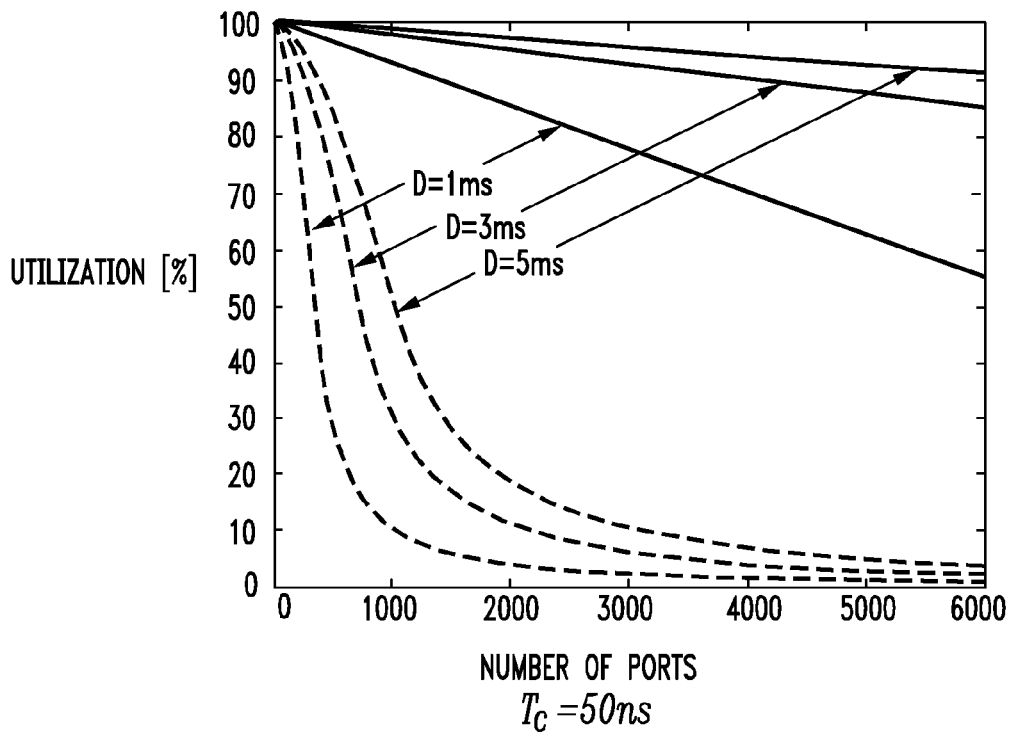
FIG. 3 is a graph of a switch utilization when counters are reset each frame, i.e. synchronized: solid curves represent the algorithm in which inputs balance flows bound for output SEs, and to the algorithm in which input SEs balance flows bound for outputs; dashed curves correspond to the algorithm in which inputs balance flows bound for outputs.
Figure 3B:
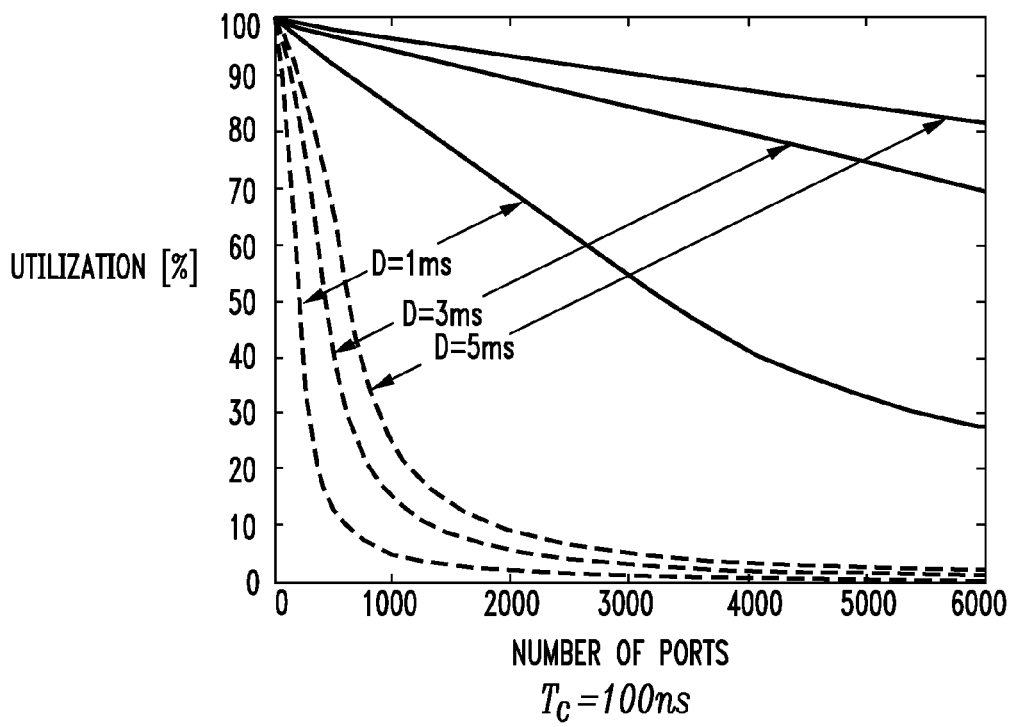

FIG. 3 shows the fabric utilization for the load balancing algorithms that reset counters to the specified values every frame. In FIG. 3(*a*) $T_c$=50 ns, while in FIG. 3(*b*) $T_c$=100 ns. The solid curves correspond to the first and fourth algorithms ($N_f$=N), while the dashed curves correspond to the second algorithm ($N_f$=nN). The efficiency of the second load balancing algorithm is improved, but, it is still low in large switches where cells bound for the particular output are spread equally across the center SEs. For example, the utilization of a fabric with 1000 ports drops below 30% for a tolerable delay of 3 ms and $T_c$=50 ns, and again drops below 10% in a switch with 4000 ports. The efficiency of the first and fourth load balancing algorithms is improved too, i.e. for the same tolerable delay and cell duration the utilization of a fabric with 4000 ports is 90%. Note that utilizations are lower in FIG. 3 (*b*) when the cell duration is longer, $T_c$=100 ns. Again, the first and fourth load balancing algorithms provide much better performance than the second load balancing algorithm.

In another embodiment of the present invention, the utilization of the transmission capacity is maximized to 100% by implementing the switching fabric with a speedup. The speedup required to provide non-blocking varies for different load balancing algorithms. In the simple case when different counters are not synchronized, required speedups can be obtained from formula (46) to be:

$$S_{a1} = S_{a3} = 1 + \frac{N}{F}, \quad (55)$$

$$S_{a2} = 1 + \frac{nN}{F}.$$

When the counters are synchronized, required speedups are decreased and are obtained from formula (47) as follows:

$$S_{r1} = S_{r3} = \begin{cases} 1 + \frac{N}{2F} & F \geq \frac{N}{2} \\ \sqrt{\frac{2N}{F}} & F < \frac{N}{2} \end{cases}, \quad (56)$$

$$S_{r2} = \begin{cases} 1 + \frac{nN}{2F} & F \geq \frac{nN}{2} \\ \sqrt{\frac{2nN}{F}} & F < \frac{nN}{2} \end{cases}.$$

Speedups required to pass the packets with a tolerable delay of D can be calculated from formula (55):

$$S_{a1} = S_{a3} = 1 + \frac{3NT_c}{D}, \quad (57)$$

$$S_{a2} = 1 + \frac{3nNT_c}{D}$$

When the counters are synchronized, required speedups are decreased and are obtained from formula (56) as follows:

$$S_{r1} = S_{r3} = \begin{cases} 1 + \frac{3NT_c}{2D} & D \geq \frac{3NT_c}{2} \\ \sqrt{\frac{6NT_c}{D}} & D < \frac{3NT_c}{2} \end{cases}, \quad (58)$$

$$S_{r2} = \begin{cases} 1 + \frac{3nNT_c}{2D} & D \geq \frac{3nNT_c}{2} \\ \sqrt{\frac{6nNT_c}{D}} & D < \frac{3nNT_c}{2} \end{cases}.$$

Figure 4A:
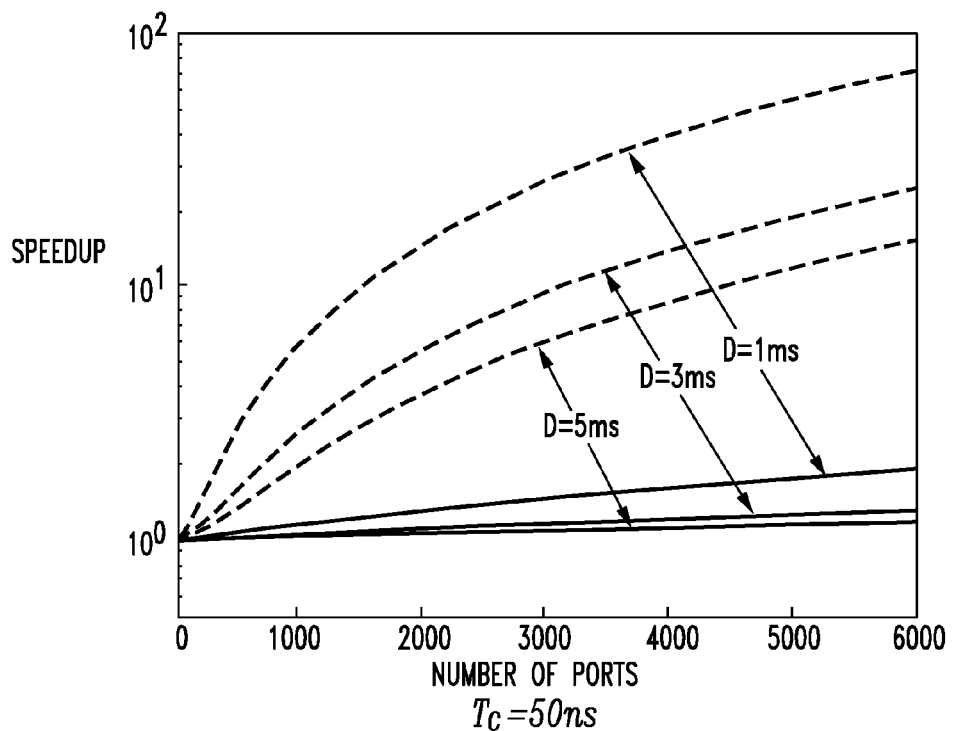
FIG. 4 is a graph of a non-blocking switch speedup: solid curves represent the algorithm in which inputs balance flows bound for output SEs, and to the algorithm in which input SEs balance flows bound for outputs; dashed curves correspond to the algorithm in which inputs balance flows bound for outputs.
Figure 4B:
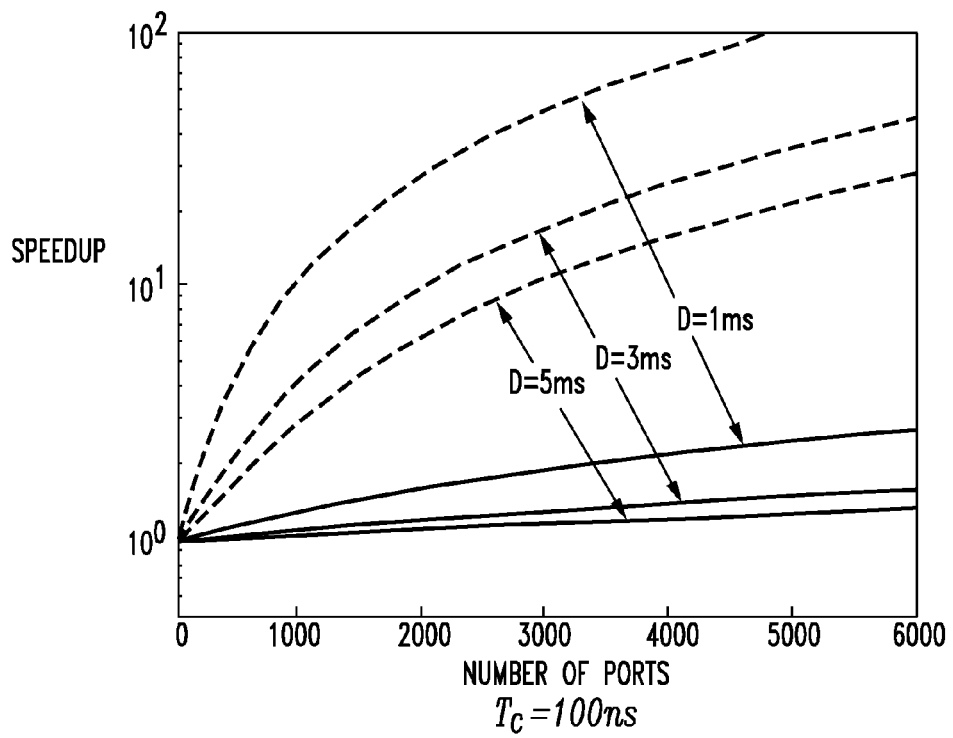

FIG. 4 shows the fabric speedup that provides non-blocking through a switch for various delay requirements. In FIG. 4(a) $T_c$=50 ns, while in FIG. 4(b) $T_c$=100 ns. The solid curves represent the first and fourth algorithms ($N_f$=N), while the dashed curves correspond to the second algorithm ($N_f$=nN). If the cell duration is 50 ns, the second load balancing algorithm requires the speedups larger than 2 and 10, in order to provide the delay less than 3 ms through a switch with 1000 and 4000 ports, respectively. If the cell duration is 100 ns, the second load balancing algorithm requires the speedups larger than 4 and 11, in order to provide the delay less than 3 ms through a switch with 1000 and 4000 ports, respectively. On the other side, the speedup required when the first and fourth load balancing algorithms are applied is close to 1 for all switch parameters.

Figure 5A:
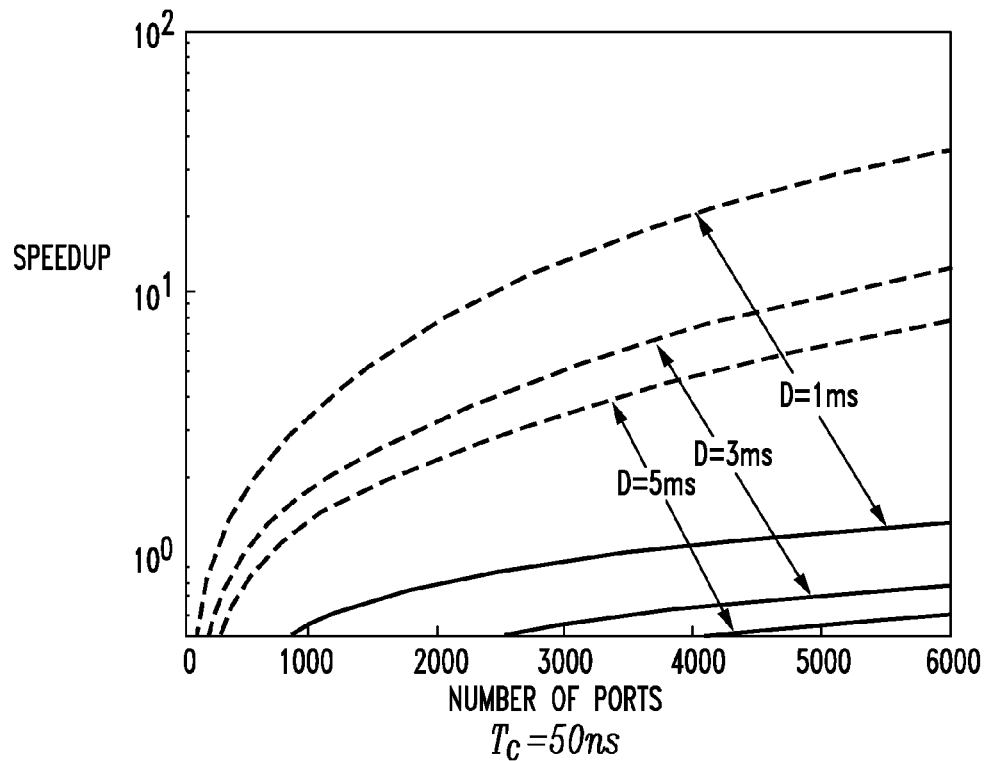
FIG. 5 is a graph of a non-blocking switch speedup when the counters are reset each frame, i.e. synchronized: solid curves represent the algorithm in which inputs balance flows bound for output SEs, and to the algorithm in which input SEs balance flows bound for outputs; dashed curves correspond to the algorithm in which inputs balance flows bound for outputs.
Figure 5B:
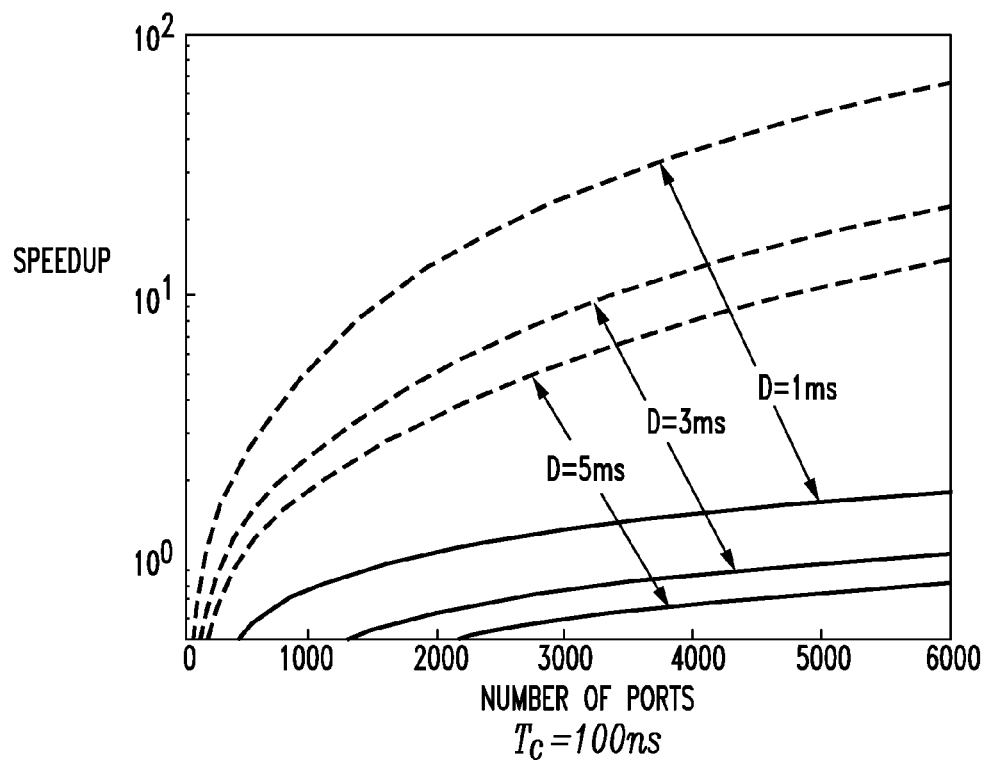

FIG. 5 shows the fabric speedup that provides non-blocking through a switch for various delay requirements in the case when the counters used for balancing are synchronized. In FIG. 4(a) $T_c$=50 ns, while in FIG. 4(b) $T_c$=100 ns. The solid curves represent the first and fourth algorithms ($N_f$=N), while the dashed curves correspond to the second algorithm ($N_f$=nN). If the cell duration is 50 ns, the second load balancing algorithm requires the speedups larger than 2 and 7, in order to provide the delay less than 3 ms through a switch with 1000 and 4000 ports, respectively. If the cell duration is 100 ns, the second load balancing algorithm requires the speedups larger than 2 and 10, in order to provide the delay less than 3 ms through a switch with 1000 and 4000 ports, respectively. Thus, the required speedup is sometimes decreased when the counters are synchronized. No speedup is needed when the first and fourth load balancing algorithms are applied and the counters are synchronized.

Therefore, it is preferred that cells bound for the output SE are spread equally across center SEs, or that input SEs spread cells across center SEs ($N_f$<N). Since the performance improves as the number of balanced flows decreases, all algorithms for which $N_f \leq N$ perform well. However, the implementation of the algorithms where input SEs balance the traffic may be more complex, and, consequently, less scalable. First, inputs have to exchange the information with the SE arbiter. Secondly, counters of the arbiter should be updated n times per cell time slot, which may require advanced processing capability, and may limit the number of SE ports, i.e. the total switch capacity. Also, these algorithms assume the SEs with the shared buffers whose capacity was shown to be smaller than the capacity of crossbar SEs. Note that in the Turner article (J. S. Turner, *Proceeding of INFO-COM* 1994, 1:298-305), it was proposed that the end-to-end sessions are separately balanced in a switch. In that case $N_f \geq nN$; and consequently the performance is poorer than in the cases that were examined in this specification.

Figure 6:
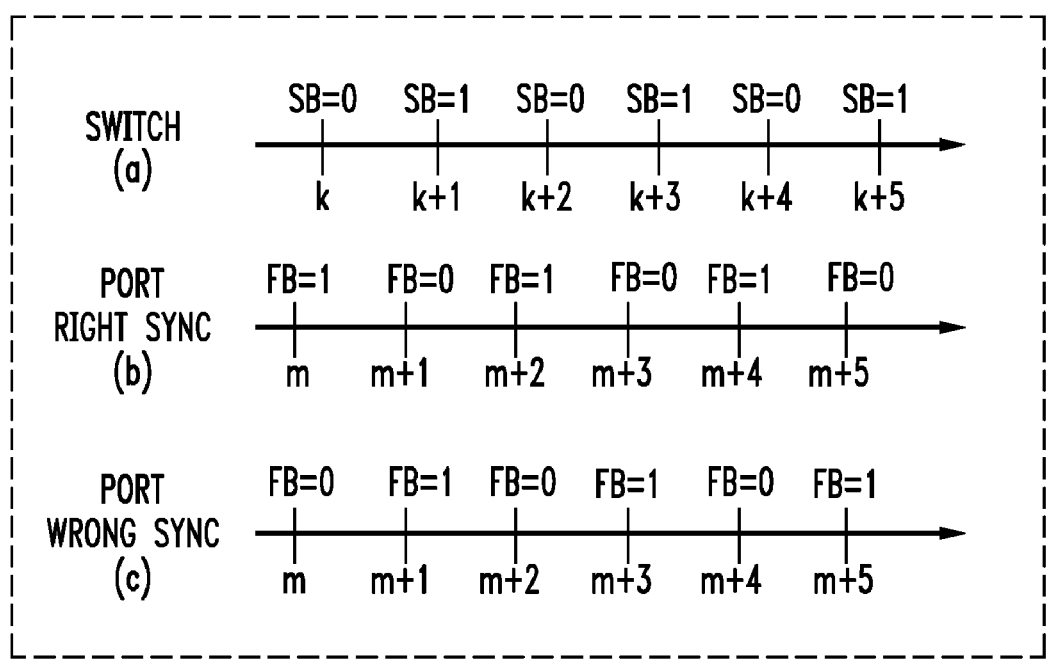
FIG. 6 is a diagram of a synchronization of the packet scheduling.

In some cases, there is a coarse synchronization in a switch during the flow of data, i.e. at some point of time the input ports schedule cells belonging to the same frame. In one embodiment of the present invention, if the frames at different ports are not synchronized, the correct switch operation can be accomplished in the following way. Frames are delineated by designated packets. One extra bit per packet, FB, is set at the port to denote its frame, and is toggled in each frame. In a given frame the switch arbiter will schedule only packets received before such frame with FB equal to the specified switch bit, SB. SB toggles in each frame as well. FIG. 6 illustrates this synchronization. The upper axis in FIG. 6 (a) shows the switch frame boundaries, while the lower axes in FIGS. 6 (b) and (c) show the port frame boundaries. At the beginning of each switch frame, SB toggles, and at the beginning of each port frame, FB toggles, as shown. Thus, only packets with FB=SB=0 that have arrived before the switch frame k+2 in FIG. 6 (a) will be scheduled in the switch frame k+2; and these are packets of the upper port frame m+1 in FIG. 6 (b). Similarly, packets of the port frame m+2 will be scheduled in the switch frame k+2 etc. In FIG. 6 (b), the port is synchronized properly, while in FIG. 6 (c), it is not. Namely, packets arriving at the end of the port frame m and packets arriving at the beginning of the port frame m+2 are eligible for scheduling in the switch frame k+3. So, the number of packets bound for some output that will be scheduled in frame k+3 might exceed negotiations, and would be blocked. Thus, SB and FBs have to be properly synchronized: an arbiter sets FB=1−SB if the switch frame boundary preceded the previous port frame boundary (delineation packet), or FB=SB otherwise, where FB is the frame bit of the first packet arriving as the synchronization process started. Although the coarse synchronization may introduce an additional delay smaller than the frame duration, the synchronization simplifies the controller implementation.

Multiple priorities can be served in the switch. In each SE, high priority cells are first served and their number is limited according to the various admission control conditions that were described above. On the other side, there are no limits for low priority cells which are served if they can get through after the high-priority cells are served. By limiting the number of high-priority cells with the above equation, they are served with the guaranteed delay. If there is any resource left, namely time slots in which some input and output are idle, and there are lower priority cells between them, the lower priority cells are served without any delay guarantees.

Multicasting

A significant amount of traffic on the Internet is multicast in nature; i.e. it carries the information from one source to multiple destinations. Scheduling of multicast packets in switches is a complicated task. If a multicast packet is scheduled to be simultaneously transmitted to all destination outputs, it may be unacceptably delayed. On the other side, if the multicast packet is scheduled to be separately transmitted to all destination outputs, its transmission may consume an unacceptably large portion of the input transmission capacity.

It has been proposed earlier that multicast packet should be forwarded through high-capacity switches (Chaney et al., *Proceedings of INFOCOM* 1997, 1:2-11 (1997); A. Smiljanić, *IEICE/IEEE Workshop on High-Performance Switching and Routing*, May 2002, pp. 29-33; A. Smiljanić, *IEEE Communication Magazine*, November 2002, pp. 72-77; J. S. Turner, "An optimal nonblocking multicast virtual circuit switch," *Proceeding of INFOCOM* 1994, vol. 1, pp. 298-305). Namely, a multicast input sends multicast packets to a limited number of destinations, and each multicast destination output that received the packets will forward them to a limited number of destination outputs who did not received them yet, and such forwarding continues until all destination outputs received all the packets. By choosing appropriate forwarding fan-out P, i.e. the number of destination outputs to which a packet is forwarded from one port, the switch utilization and the guaranteed delay could be selected (A. Smiljanić, *IEICE/IEEE Workshop on High-Performance Switching and Routing*, May 2002, pp. 29-33; A. Smiljanić, *IEEE Communication Magazine*, November 2002, pp. 72-77).

Packets can be forwarded in two ways. In the first case, a port separately transmits a multicast packet to its destination ports. Then, the packet flow is determined solely based on its input and output ports as in the case of unicast packets. In the second case, a port transmits only one copy of a multicast packet to the Clos network. The multicast packet is transmitted through the network until the last SE from which it can reach some destination port where it is replicated and its copies are routed separately through the remainder of the network. So, the multicast flow is balanced in stages before the packet replication starts. In this case, the packet flow is determined by its input port and its multiple destinations of ports. Obviously, the number of flows is increased in this way, and the performance of load balancing is degraded. On the other side, the port transmission capacity required for forwarding is less. It was shown earlier that P=2 is the most practical choice; then, the port transmission capacity improvement is less than the utilization degradation due to imperfect load balancing, so the first multicasting scheme is recommended. In any case, the performance of the second multicasting scheme is improved when the number of flows is minimized.

Again, various load balancing algorithms can be performed depending on the definition of the flows that are separately balanced. Similarly, as for unicast transmission, four basic algorithms are provided.

In the first algorithm, all cells sourced by some input and bound to some set of P output SEs define one flow. So, for each multicast cell, its output SEs are determined, and the flow is determined by the found set of output SEs. There are $N_f = nn(n-1)/2 \approx nN/2$ of such flows that are balanced through and link from input port to center SE. Remember that the corresponding utilization $U_a = 1 - N_f/F = 1 - nN/(2F)$ has been shown to be unsatisfactory.

In the second algorithm, all cells sourced by some input and bound to some set of P outputs define one flow. There is an enormous number, $N_f = nN(N-1)/2 \approx nN^2/2$, of such flows that are balanced through and link from input port to center SE, and this algorithm should be avoided by all means.

In the third algorithm, all cells sourced by some input SE and bound to some set of P output SEs define one flow. There are $N_f = n(n-1)/2 \approx N/2$ of such flows that are balanced through and link from input to center SE. Thus, the performance of the third algorithm will be fine as shown before.

In the fourth algorithm, all cells sourced by some input SE and bound to some set of P outputs define one flow. There is again an enormous number, $N_f = N(N-1)/2 \approx N^2/2$, of such flows that are balanced through and link from input to center SE. The fourth algorithm should be by all means avoided. The only well performing algorithm is more complex for the implementation, and it assumes the SEs with shared buffers which have the smaller capacity than the cross-bar SEs.

Improvement in the performance of load balancing of unicast and multicast flows in a fabric can be accomplished by increasing the frame length, balancing flows among different internal SEs, implementing the fabric with a speedup, or combinations thereof.

Implementation

The methods of the present invention can be implemented by an article of manufacture which comprises a machine readable medium containing one or more programs which when executed implement the steps of the methods of the present invention.

For example, the methods of the present invention can be implemented using a conventional microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific units, such as integrated circuits (ASIC), configurable logic blocks, field programmable gate arrays, or by interconnecting an appropriate network of conventional circuit components, as will be readily apparent to those skilled in the art.

The article of manufacture can comprise a storage medium can include, but is not limited to Random-Access Memory (RAMs) for storing lookup tables. In one embodiment, the assignment of cells to a flow comprise inputting the i, j designation of a cell into a lookup table which table assigns to the cell an input and output set, an input and output subset, and the flow of the cell.

The methods of the present invention can be implemented by an apparatus which comprises: a flow control device configured to perform the steps of the invention. The apparatus can also comprise a counter module configured to assign counters to each flow pursuant to the methods of the invention.

The present invention also includes a multistage nonblocking fabric which comprises a network of switches that perform the method steps of the invention. The fabric comprises at least one internal switching element (SE) stage, wherein the stage has l internal switching elements, an input SE stage, an output SE stage, input ports which are divided into input sets wherein each input set consists of input ports that transmit through the same input SE, and wherein the input sets are further divided into input subsets, and output ports which are divided into output sets wherein each output set consists of output ports that receive cells through the same output SE, and wherein the output sets are further divided into output subsets, and a flow assignment module wherein the module assigns cells which are received into the fabric to a flow. The assignment module comprises a lookup table.

Thus, while there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

The invention claimed is:

1. A method for balancing unicast or multicast flows in a multistage non-blocking fabric, wherein the fabric comprises at least one internal switching element (SE) stage, wherein the stage has l internal switching elements, wherein each internal switching element is associated with a unique numerical identifier, and wherein the fabric comprises an input SE stage and an output SE stage, wherein the method comprises:
   (a) grouping input ports into input sets whereby each input set consists of input ports that transmit through the same input SE, and wherein the input sets are divided into input subsets, and
   (b) grouping output ports into output sets whereby each output set consists of output ports that receive cells through the same output SE, and wherein the output sets are divided into output subsets,
   (c) receiving cells into the fabric wherein
   if a cell is a unicast cell, then the cell is associated with an input subset i and associated with an output subset j based on the input port and the output port of the cell, else
   if a cell is a multicast cell, then the cell is associated with an input subset i and associated with multiple output subsets {j} based on the input port and the multiple output ports of the cell,
   (d) assigning each cell to a flow, wherein
      (i) if the cells are unicast cells, then the cells which are associated with the same input subset and associated with the same output subset are assigned to the same flow, else
      (ii) if the cells are multicast cells, then the cells which are associated with the same input subset and associated with the output subsets of the same output sets are assigned to the same flow, and
   (e) transmitting flows through the internal SE stage wherein cells of a particular flow are distributed among the internal switching elements, wherein the quantity of the cells of each particular flow transmitted through each internal SE differs by at most h, wherein h is positive, wherein the number of subsets of at least one input set or at least one output set is less than n, wherein n is the number of ports of that input SE or of that output SE, and wherein N is the total number of input ports and output ports, and wherein $N_f$ is the maximum number of flows whose cells pass any given link, and wherein n, N, $N_f$, h, i, j and l are natural numbers, wherein the flow in the fabric is balanced.

2. The method according to claim 1 wherein h is one.

3. The method according to claim 2 wherein step (e) comprises the sub-steps of:
   (a) associating a unique counter with a flow, wherein a counter is designated as $c_{ij}$, wherein i is the numerical identifier of an associated input subset and j is the numerical identifier of an associated output subset;
   (b) initializing the counter with a number less than or equal to l;
   (c) transmitting a cell from the flow through the internal switching element associated with a numerical identifier which is equal to the numerical value of the counter;
   (d) changing the numerical value of the counter by decrementing or incrementing the counter modulus l; and
   (e) stopping if there are no more cells from the flow, otherwise go to step (c), wherein the sub-steps are performed for each flow.

4. The method according to claim 2 wherein at least one of the input ports belongs to at least two input subsets, or wherein at least one of the output ports belongs to at least two output subsets, or combinations thereof.

5. The method according to claim 3 further comprising:
   grouping cell time slots into frames of length F,
   wherein the counter of each flow is set at the beginning of each frame, and wherein the counter is set to $c_{ij}=(i+j) \bmod l$.

6. The method according to claim 2 further comprising:
   grouping cell time slots into frames of length F,
   allowing in each frame input port (i) to transmit up to $a_{ij}$ cells or high-priority cells to output port (j), and wherein:

$$\sum_k a_{ik} \leq SF - N_f, \sum_k a_{ki} \leq SF - N_f$$

where S is the switching fabric speedup.

7. The method according to claim 6 wherein at each stage only cells that have arrived in the same frame are transmitted to the next stage, wherein $F=D/3T_c$ or $F=D/4T_c$ if cells are reordered at the outputs, wherein D is the maximum tolerable delay and $T_c$ is cell time slot duration.

8. The method according to claim 6 wherein:

$$S = 1 + \frac{N_f}{F},$$

and:

$$\sum_k a_{ik} \leq F, \sum_k a_{ki} \leq F,$$

whereby the utilization of the fabric is maximized.

9. The method according to claim 8 wherein at each stage only cells that have arrived in the same frame are transmitted to the next stage, wherein $F=D/3T_c$ or $F=D/4T_c$ if cells are reordered at the outputs, wherein D is the maximum tolerable delay and $T_c$ is cell time slot duration.

10. The method according to claim 2 wherein sets are divided in a way that $$N_f \leq (S-U) \cdot D/T_c,$$

where S is switching fabric speedup, U is targeted utilization of the switching fabric, D is the maximum tolerable delay and $T_c$ is cell time slot duration.

11. The method according to claim 2 further comprising:
grouping cell time slots into frames of length F,
allowing in each frame input port (i) to transmit $a_{ij}$ cells or high-priority cells to output port (j), and wherein the number of flows sourced by an input SE or bound for an output SE that are balanced starting from different internal SE differ by at most one, wherein:

$$\sum_k a_{ik} \leq \begin{cases} SF - \frac{N_f}{2} & F \geq \frac{N_f}{S} \\ \frac{(SF)^2}{2N_f} & F < \frac{N_f}{S} \end{cases}, \sum_k a_{ki} \leq \begin{cases} SF - \frac{N_f}{2} & F \geq \frac{N_f}{S} \\ \frac{(SF)^2}{2N_f} & F < \frac{N_f}{S} \end{cases}$$

where S is the switching fabric speedup.

12. The method according to claim 11 wherein at each stage only cells that have arrived in the same frame are transmitted to the next stage, wherein $F=D/3T_c$ or $F=D/4T_c$ if cells are reordered at the outputs, wherein D is the maximum tolerable delay and $T_c$ is cell time slot duration.

13. The method according to claim 11 wherein:

$$S = \begin{cases} 1 + \frac{N_f}{2F} & F \geq \frac{N_f}{2} \\ \sqrt{\frac{2N_f}{F}} & F < \frac{N_f}{2} \end{cases},$$

and wherein:

$$\sum_k a_{ik} \leq F, \sum_k a_{ki} \leq F,$$

whereby utilization of the fabric is maximized.

14. The method according to claim 13 wherein at each stage only cells that have arrived in the same frame are transmitted to the next stage, wherein $F=D/3T_c$ or $F=D/4T_c$ if cells are reordered at the outputs, wherein D is the maximum tolerable delay and $T_c$ is cell time slot duration.

15. The method according to claim 11 wherein the counter of each flow is set at the beginning of each frame, and wherein the counter is set to $c_{ij}=(i+j) \mod l$, wherein i is the numerical identifier of an associated input subset and j is the numerical identifier of an associated output subset, comprising the following steps:
(a) transmitting a cell from the flow through the internal switching element associated with a numerical identifier which is equal to the numerical value of the counter of this flow; and
(b) changing the numerical value of the counter by decrementing or incrementing the counter modulus l, and
(c) stopping if there are no more cells from the flow, otherwise go to step (a), wherein the sub-steps are performed for each flow.

16. The method according to claim 2 wherein the numbers of flows sourced by an input SE or bound for an output SE that are balanced starting from different internal SEs differ by at most 1, wherein the subsets are grouped so that $N_f$ fulfills:

$$N_f \leq \begin{cases} 2(S-U) \cdot F & U \geq \frac{S}{2} \\ \frac{S^2 F}{2U} & U < \frac{S}{2} \end{cases}$$

where S is the switching fabric speedup, U is targeted utilization of the switching fabric, D is the maximum tolerable delay and $T_c$ is cell time slot duration.

17. An article of manufacture for balancing unicast or multicast flows in a multistage non-blocking fabric, wherein the fabric comprises at least one internal switching element (SE) stage, wherein the stage has l internal switching elements, wherein each internal switching element is associated with a unique numerical identifier, and wherein the fabric comprises an input SE stage and an output SE stage, wherein the article comprises:
a computer readable medium containing one or more programs which when executed implement the steps of:
(a) dividing input ports into input sets whereby each input set consists of input ports that transmit through the same input SE, and wherein the input sets are further divided into input subsets, and
(b) dividing output ports into output sets whereby each output set consists of output ports that receive cells through the same output SE, and wherein the output sets are further divided into output subsets,
(c) assigning each cell received into the fabric to a flow comprising:
(i) if a cell is a unicast cell, then associating the cell received into the fabric with an input subset and with an output subset based on the input port i and the output port j of the cell, wherein cells which are associated with the same input subset and associated with the same output subset are assigned to the same flow, else
(ii) if a cell is a multicast cell, then the cell is associated with an input subset and associated with multiple output subsets based on the input port i and the multiple output ports {j} of the cell, wherein cells which are associated with the same input subset and associated with the output subsets of the same output sets are assigned to the same flow, and
(d) transmitting flows through the internal SE stage wherein cells of a particular flow are distributed among the internal switching elements, wherein the quantity of the cells of each particular flow transmitted at each internal SE differs by at most h, wherein h is positive,
wherein the number of subsets of at least one input set or at least one output set is less than n, wherein n is the number of ports of that input SE or of that output SE, and wherein N is the total number of input ports and output ports, and wherein $N_f$ is the maximum number of flows whose cells pass any given link, and wherein n, N, $N_f$, h, i, j and l are natural numbers.

18. The article according to claim 17 wherein h is one.

19. The article according to claim 18 wherein (d) comprises
a machine readable medium containing one or more programs which when executed implement the steps of:
(a) associating a unique counter with a flow, wherein a counter is designated as $c_{ij}$, wherein i is the numerical identifier of an associated input subset and j is the numerical identifier of an associated output subset;

(b) initializing the counter with a number less than or equal to l;
(c) transmitting a cell from the flow through the internal switching element associated with a numerical identifier which is equal to the numerical value of the counter; and
(d) changing the numerical value of the counter by decrementing or incrementing the counter modulus l, and
(e) stopping if there are no more cells from the flow, otherwise go to step (c), wherein the sub-steps are performed for each flow.

20. An apparatus for balancing unicast or multicast flows in a multistage non-blocking fabric, wherein the fabric comprises at least one internal switching element (SE) stage, wherein the stage has l internal switching elements, wherein each internal switching element is associated with a unique numerical identifier, and wherein the fabric comprises an input SE stage and an output SE stage, the apparatus comprises:
a flow control device configured to:
(a) divide input ports into input sets whereby each input set consists of input ports that transmit through the same input SE, and wherein the input sets are further divided into input subsets, and
(b) divide output ports into output sets whereby each output set consists of output ports that receive cells through the same output SE, and wherein the output sets are further divided into output subsets,
(c) assign each cell received into the fabric to a flow comprising:
(i) if a cell is a unicast cell, then associate the cell received into the fabric with an input subset and with an output subset based on the input port i and the multiple output ports {j} of the cell, wherein cells which are associated with the same input subset and associated with the same output subsets are assigned to the same flow, else
(ii) if a cell is a multicast cell, then the cell is associate with an input subset and associated with multiple output subsets based on the input port i and the multiple output ports {j} of the cell, wherein cells which are associated with the same input subset and associated with the output subsets of the same output sets are assigned to the same flow, and
(d) transmit flows through the internal SE stage wherein cells of a particular flow are distributed among the internal switching elements, wherein the quantity of the cells of each particular flow transmitted at each internal SE differs by at most h, wherein h is positive,
wherein the number of subsets of at least one input set or at least one output set is less than n, wherein n is the number of ports of that input SE or of that output SE, and wherein N is the total number of input ports and output ports, and wherein $N_f$ is the maximum number of flows whose cells pass any given link, and wherein n, N, $N_f$, h, i, j and l are natural numbers.

21. The apparatus according to claim 20 wherein (d) comprises
a counter module configured to:
(a) associate a unique counter with a flow, wherein a counter is designated as $c_{ij}$;
(b) initialize the counter with a number less than or equal to l;
(c) transmit a cell from the flow through the internal switching element associated with a numerical identifier which is equal to the numerical value of the counter;
(d) change the numerical value of the counter by decrementing or incrementing the counter modulus l, and
(e) stop if there are no more cells from the flow, otherwise go to step (c), wherein the sub-steps are performed for each flow.

22. A multistage non-blocking switch comprising:
(a) at least one internal switching element (SE) stage, wherein the stage has l internal switching elements, wherein each internal switching element is associated with a unique numerical identifier,
(b) an input SE stage,
(c) an output SE stage,
(d) input ports which are divided into input sets wherein each input set consists of input ports that transmit through the same input SE, and wherein the input sets are further divided into input subsets, and
(e) output ports which are divided into output sets wherein each output set consists of output ports that receive cells through the same output SE, and wherein the output sets are further divided into output subsets, and
(f) a flow assignment module wherein the module assigns cells which are received into the fabric to a flow, wherein the assignment comprises
(i) if a cell is a unicast cell, then the cell is associated with an input subset and associated with an output subset based on the input port i and the output port j of the cell, wherein cells which are associated with the same input subset and associated with the same output subset are assigned to the same flow, else
(ii) if a flow is a multicast flow, then each cell is associated with an input subset and associated with multiple output subsets based on the input port i and the multiple output ports {j} of the cell, wherein cells which are associated with the same input subset and associated with the output subsets of the same output sets are assigned to the same flow,
whereby flows are transmitted through the internal SE stage wherein cells of a particular flow are distributed among the internal switching elements, wherein the quantity of the cells of each particular flow transmitted at each internal SE differs by at most h, wherein h is positive,
wherein the number of subsets of at least one input set or at least one output set is less than n, wherein n is the number of ports of that input SE or of that output SE, and wherein N is the total number of input ports and output ports, and wherein $N_f$ is the maximum number of flows whose cells pass any given link, and wherein n, N, $N_f$, h, i, j and l are natural numbers.

23. The fabric according to claim 22 wherein the assignment module comprises a lookup table.

24. The fabric according to claim 22 wherein the assignment module
(a) associates a unique counter with a flow, wherein a counter is designated as $c_{ij}$, wherein i is the numerical identifier of an associated input subset and j is the numerical identifier of an associated output subset;
(b) initializes the counter with a number less than or equal to l;
(c) transmits a cell from the flow through the internal switching element associated with a numerical identifier which is equal to the numerical value of the counter;
(d) changes the numerical value of the counter by decrementing or incrementing the counter modulus l, and
(e) stops if there are no more cells from the flow, otherwise go to step (c), wherein the sub-steps are performed for each flow.

\* \* \* \* \*